(12) United States Patent
Kramer et al.

(10) Patent No.: US 9,068,123 B2
(45) Date of Patent: *Jun. 30, 2015

(54) MULTIPURPOSE COKE PLANT FOR SYNTHETIC FUEL PRODUCTION

(75) Inventors: Robert A. Kramer, Crown Point, IN (US); Libbie S. W. Pelter, Schereville, IN (US); Harvey Abramowitz, Chicago, IL (US); Hardarshan S. Valia, Highland, IN (US); Allen Ellis, Crown Point, IN (US)

(73) Assignee: Purdue Research Foundation, West Lafayette, IN (US)

( * ) Notice: Subject to any disclaimer, the term of this patent is extended or adjusted under 35 U.S.C. 154(b) by 379 days.

This patent is subject to a terminal disclaimer.

(21) Appl. No.: 13/618,847

(22) Filed: Sep. 14, 2012

(65) Prior Publication Data

US 2013/0008771 A1    Jan. 10, 2013

Related U.S. Application Data

(63) Continuation of application No. 12/555,496, filed on Sep. 8, 2009, now Pat. No. 8,287,696.

(60) Provisional application No. 61/094,852, filed on Sep. 5, 2008.

(51) Int. Cl.
| | |
|---|---|
| *C10B 47/00* | (2006.01) |
| *C10B 53/00* | (2006.01) |
| *C10B 57/04* | (2006.01) |
| *C10B 15/02* | (2006.01) |

(Continued)

(52) U.S. Cl.
CPC ................ *C10B 57/04* (2013.01); *C10B 15/02* (2013.01); *C10G 2/32* (2013.01); *F02C 3/28* (2013.01); *C10G 2300/1022* (2013.01); *Y02E 50/32* (2013.01)

(58) Field of Classification Search
None
See application file for complete search history.

(56) References Cited

U.S. PATENT DOCUMENTS

| | | | | |
|---|---|---|---|---|
| 4,045,299 | A * | 8/1977 | MacDonald | 202/93 |
| 4,370,201 | A * | 1/1983 | Lowenhaupt | 201/1 |
| 5,318,671 | A * | 6/1994 | Pruitt | 201/1 |

(Continued)

OTHER PUBLICATIONS

Veit, G., "Compacted Charging; A Process for Economical Coke Making," International Meeting on Ironmaking, Sep. 2004, pp. 1231-1240 Sep. 1, 2004.

(Continued)

*Primary Examiner* — Nina Bhat
*Assistant Examiner* — Elizabeth Cardin
(74) *Attorney, Agent, or Firm* — Keith J. Swedo; John V. Daniluck; Bingham Greenebaum Doll LLP

(57) ABSTRACT

A new approach to the production of coke. In this process multiple optimized value streams are produced from a coke facility located at mine mouth or locally at an existing plant. As part of the process, lower cost Indiana/Illinois Basin-type coals are blended with conventional metallurgical coals. The blending process is optimized to meet coke quality requirements and simultaneously to obtain a pyrolysis gas composition suitable for production of ancillary products including liquid transportation fuels, fertilizer, hydrogen, and electricity. By using lower cost Indiana/Illinois Basin coal it is possible to reduce net coal costs. This process provides a new direction and approach for the production of coke in the future that optimizes value over multiple product streams while reducing both business and technological risk.

21 Claims, 29 Drawing Sheets

(51) Int. Cl.
*C10G 2/00* (2006.01)
*F02C 3/28* (2006.01)

(56) References Cited

U.S. PATENT DOCUMENTS

| | | | | |
|---|---|---|---|---|
| 5,807,420 | A | * | 9/1998 | Eatough et al. .............. 75/10.61 |
| 6,187,148 | B1 | * | 2/2001 | Sturgulewski ................ 202/258 |
| 6,830,660 | B1 | * | 12/2004 | Yamauchi et al. .............. 201/21 |
| 7,785,447 | B2 | * | 8/2010 | Eatough et al. .................. 201/6 |
| 8,152,970 | B2 | * | 4/2012 | Barkdoll et al. ................ 201/39 |

OTHER PUBLICATIONS

Xie, Liu, Lu, and Meng, "Coke Quality Prediction Models," Journal of Northeastern University of National Science, vol. 28, No. 3, Mar. 2007, pp. 373-377 (in Chinese with English Abstract) Mar. 1, 2007.

Shen, Jun and Wang, Zhi-zhong, "A New Technology for Producing Hydrogen and Adjustable Ratio Syngas from Coke Oven Gas," Energy & Fuels, Sep. 22, 2007, Vo.. 21, pp. 3588-3592.

U.S. Appl. No. 12/555,496, Notice of Allowance mailed Jun. 15, 2012, 8 pages.

* cited by examiner

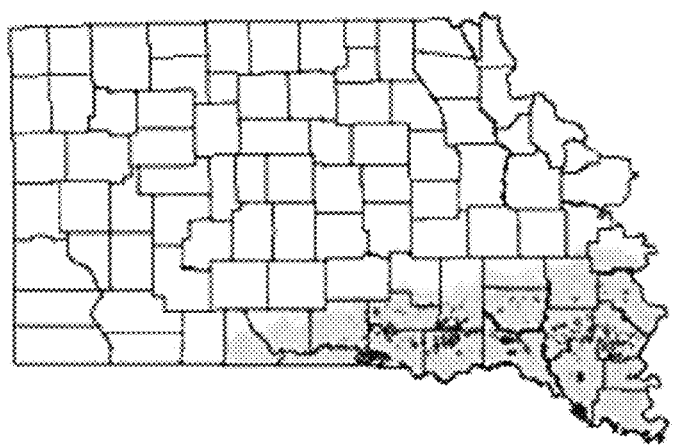
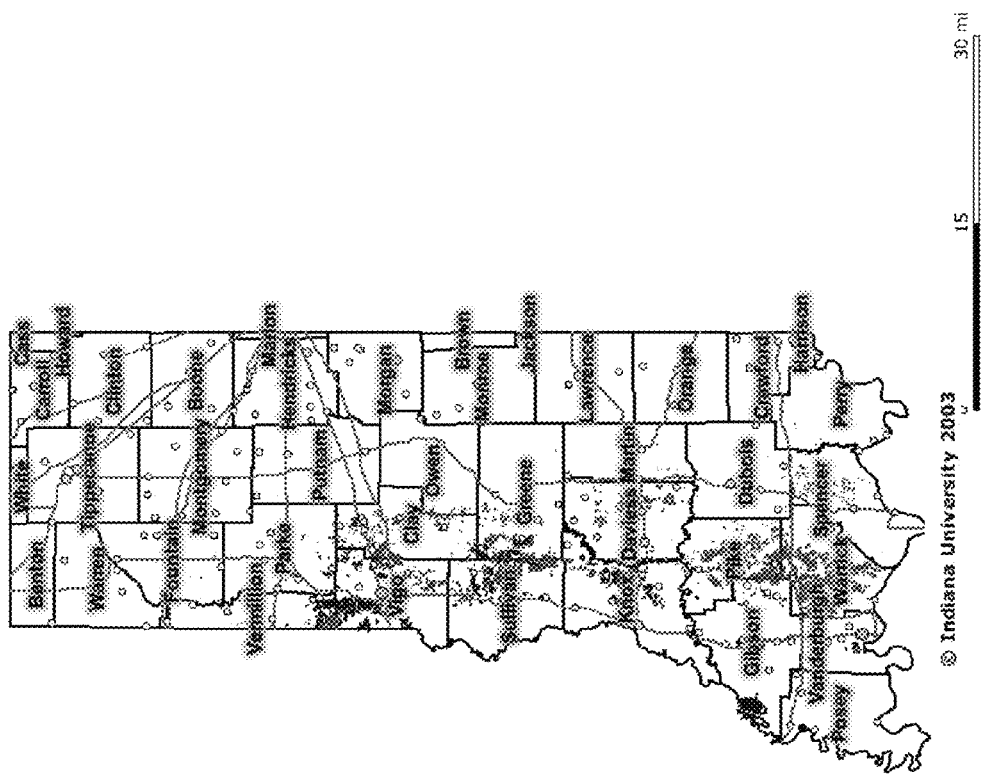
FIG. 1(b)

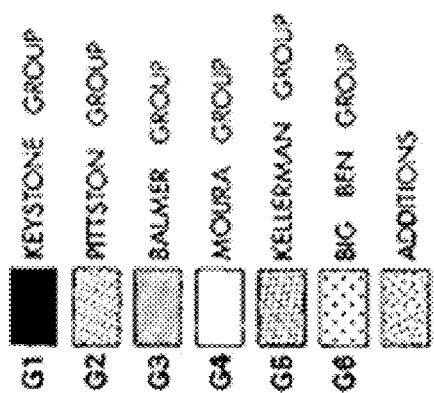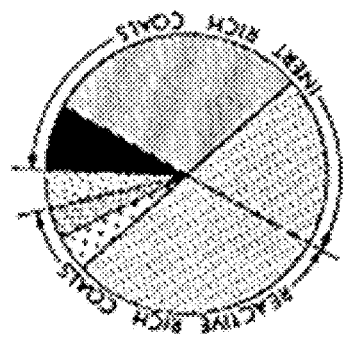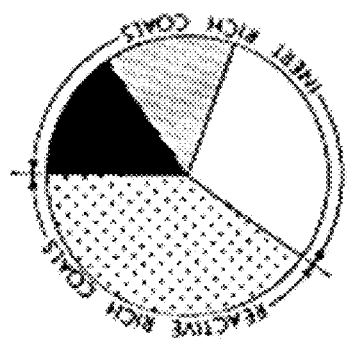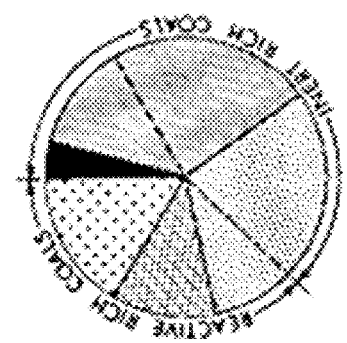
FIG. 16

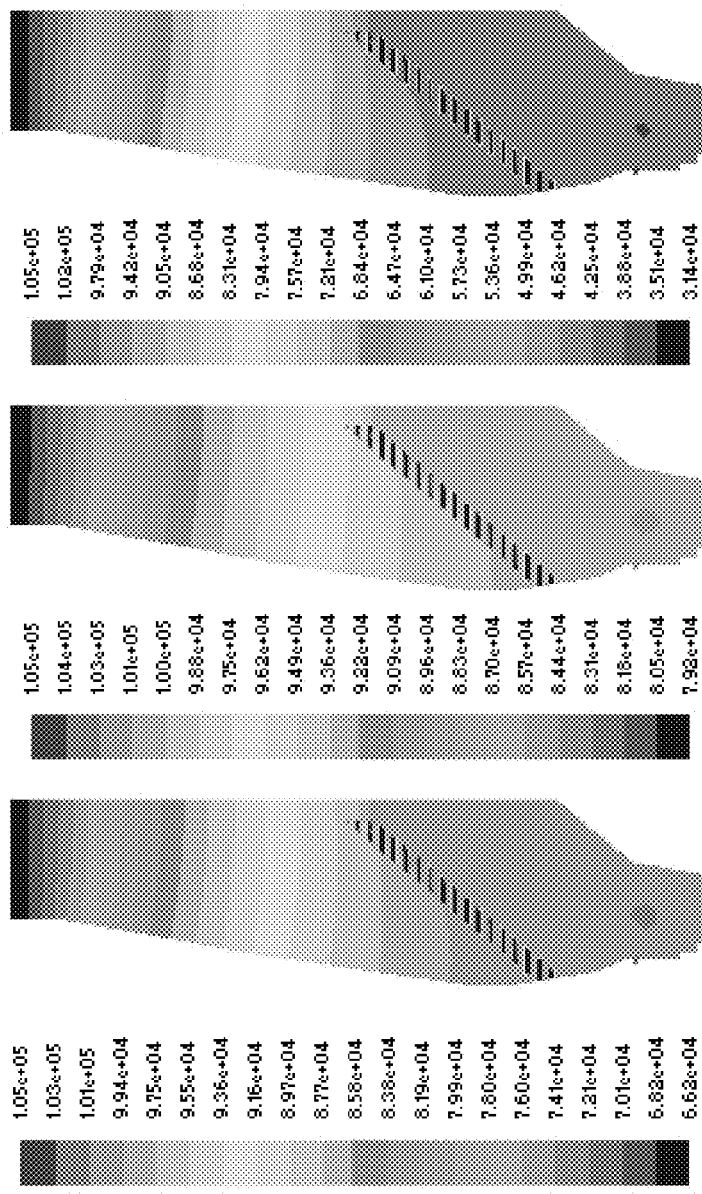
FIG. 19a  (a) Ore Dia = 0.012m
FIG. 19b  (b) Ore Dia = 0.02m
FIG. 19c  (c) Ore Dia = 0.006m

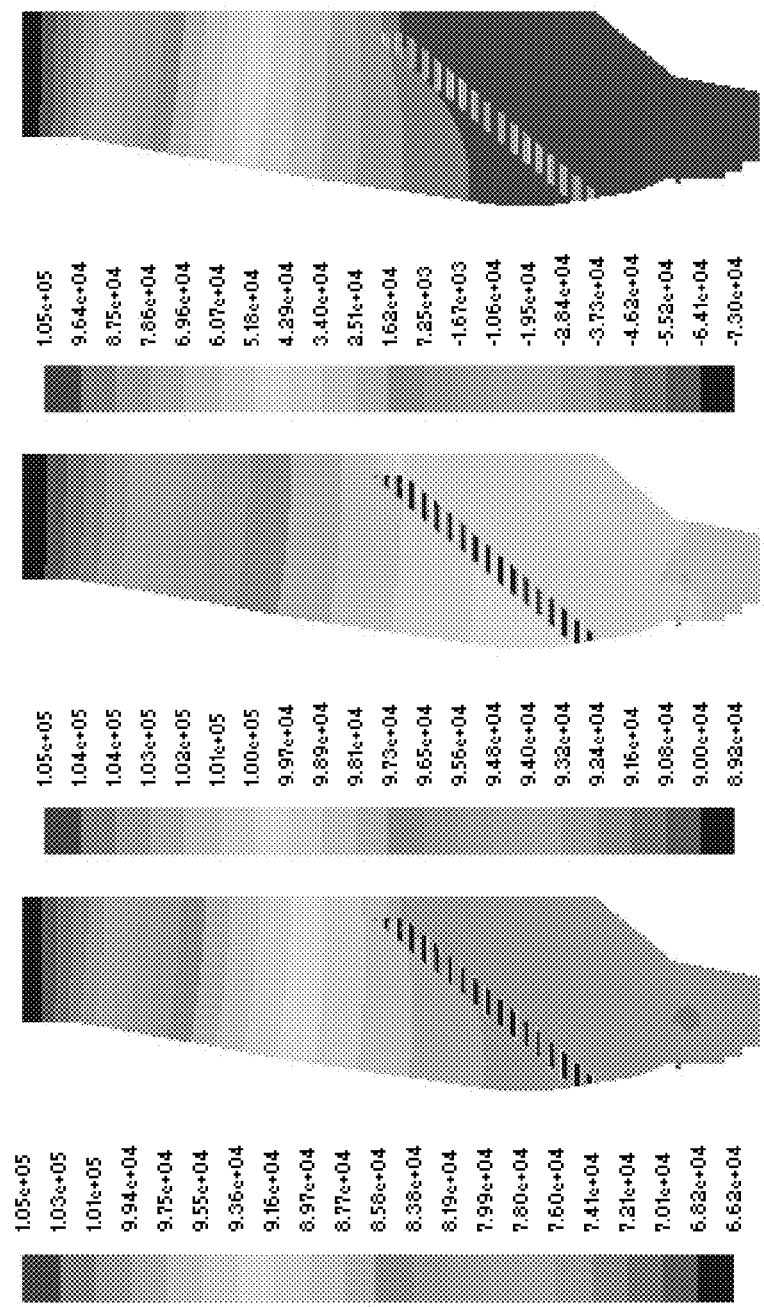
FIG. 20a (d) Ore Porosity = 0.35
FIG. 20b (e) Ore Porosity = 0.5
FIG. 20c (f) Ore Porosity = 0.2

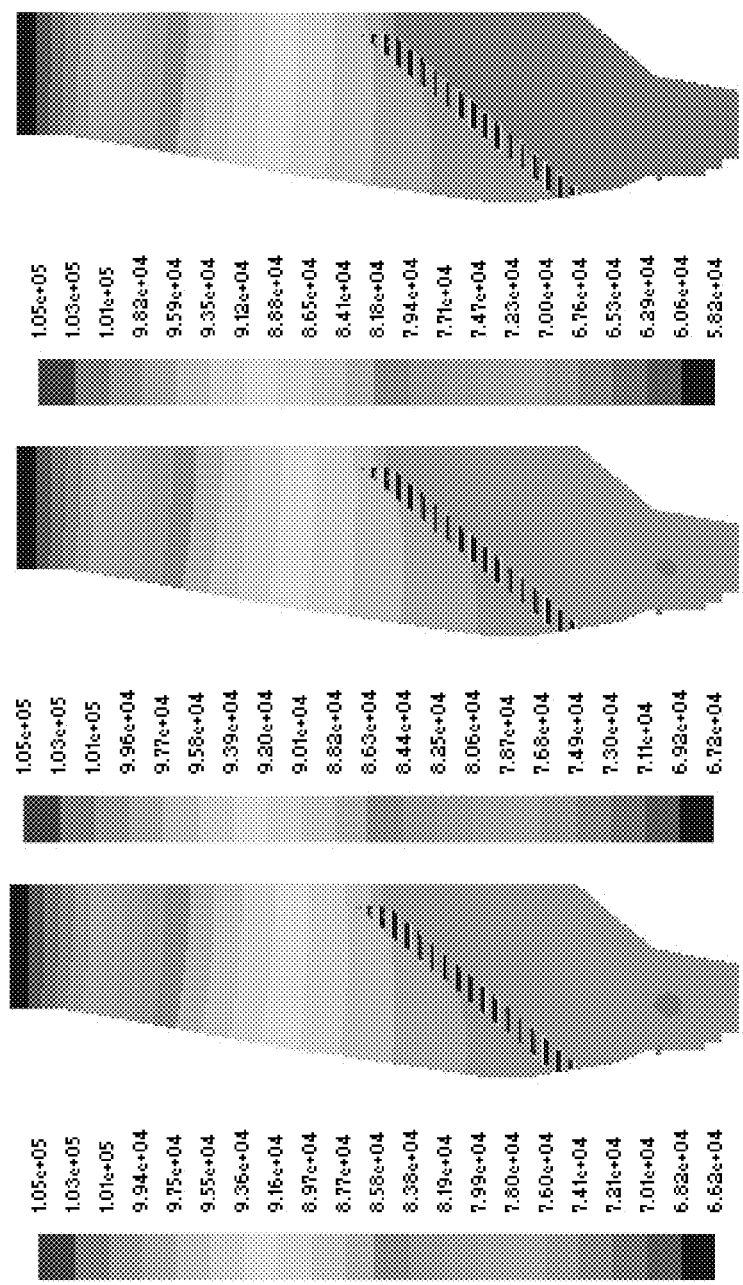

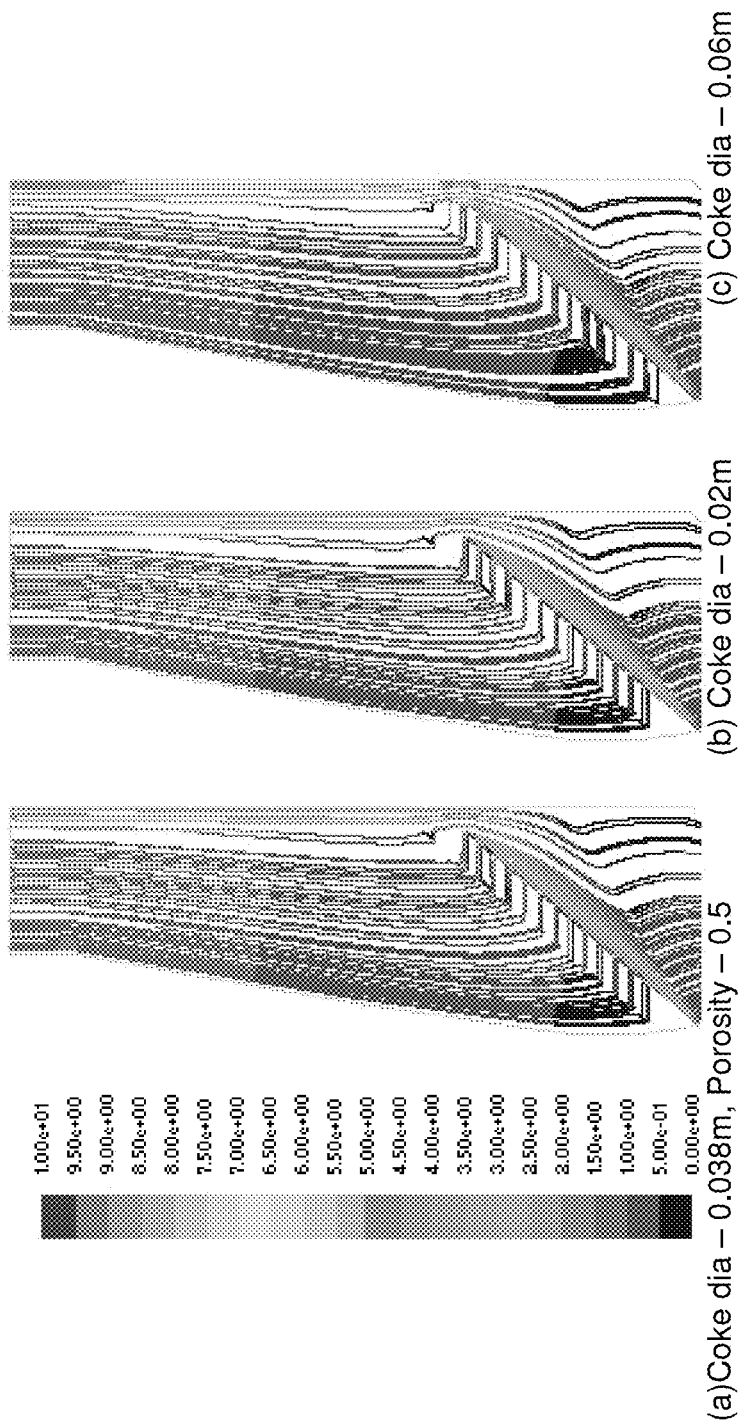

MULTIPURPOSE COKE PLANT FOR SYNTHETIC FUEL PRODUCTION

CROSS REFERENCE TO RELATED APPLICATIONS

This application is a continuation of U.S. patent application Ser. No. 12/555,496, filed Sep. 8, 2009, which claims the benefit of priority of U.S. Provisional Patent Application Ser. No. 61/094,852, filed Sep. 5, 2008, both of which are incorporated herein by reference.

FIELD OF THE INVENTION

The present invention pertains to apparatus and methods for production of coke, and in particular for apparatus and methods for producing multiple products during production of coke from blended coal.

BACKGROUND OF THE INVENTION

Coke is a solid carbon fuel and carbon source produced from coal that is used to melt and reduce iron ore. Although coke is an essential part of iron making and foundry processes, currently there is a shortfall of 5.5 million tons of coke per year in the United States. The shortfall has resulted in increased imports and drastic increases in coke prices and market volatility. For example, coke delivered FOB to a Chinese port in January 2004 was priced at $60/ton, but rose to $420/ton in March 2004 and in September 2004 was $220/ton. This makes clear the likelihood that prices will remain high.

Indiana is home to roughly 22% of the domestic base steel production for the United States. One essential raw material needed by this industry is coke. Current 2005 forecasts indicate that the United States will produce 11,500,000 net tons of coke, but will require 17,000,000 net tons for blast furnace, foundry, and related uses. At present, little or no Indiana coal is being used for coke production. In 2002, Indiana's steel industry used an estimated 10.7 million tons of coal. Of this, approximately 8.1 million tons was used for coke production. Essentially all of this coking coal comes from Kentucky, West Virginia and Virginia. The significant shortfall of needed coke has placed an enormous strain on Indiana's steel industries.

FIG. 1(a) depicts the influence of cost factors and linkages in the market. In general, captive coke plants supply their excess coke to the furnace coke market with remaining supply from merchant plants and foreign imports. Furnace coke produced at captive coke plants and shipped directly to integrated iron and steel mills owned by their parent companies do not directly enter the market for furnace coke. Environmental compliance costs incurred by captive, or "in-house", furnace coke batteries indirectly affect the furnace coke market through price and output changes in the steel mill products market.

One metric ton of coal typically produces 600-800 kg of blast-furnace coke and 296-358 $m^3$ of coke oven gas. From preliminary results it is estimated that from 0.1-0.25 barrels of liquid transportation fuel could be produced from each ton of coal used in the coking process. Currently Indiana uses approximately 8,000,000 tons of coal per year for the coke production. Use of Indiana/Illinois coal would also provide a financial incentive to the steel industry since Indiana/Illinois coal is considerably less costly than current metallurgical coal. With a blend of from 20-40% Indiana/Illinois coal significant coal cost reductions could be realized.

As the fraction of imported coal increases there will be additional pressure placed on coking coal supplies. Some embodiments of the present invention include technology to use Indiana and related types of coal to produce coke could supplement the coal supply for coking purposes and enhance the future market for such coal.

The particular mix of high- and low-volatile coals used and the length of time the coal is heated (i.e., coking time) determine the type of coke produced: (1) furnace coke, which is used in blast furnaces as part of the traditional steelmaking process, or (2) foundry coke, which is used in the cupolas of foundries in making gray, ductile, or malleable iron castings. Furnace coke is produced by heating a coal mix of 10 to 30 percent low-volatile coal for 16 to 18 hours at temperatures of 2,200° F. Most blast furnace operators use coke sized between 0.75 inches and 3 inches. Foundry coke is also produced by heating a mix of 50 percent or more low-volatile coal for 27 to 30 hours at temperatures of 1,800° F. Coke size requirements in foundry cupolas are a function of the cupola diameter (usually based on a 10:1 ratio of cupola diameter to coke size) with foundry coke ranging in size from 4 inches to 9 inches. The longer coking times and lower temperatures for foundry coke results in a longer life of these batteries.

Competition from China also will increase pressure on domestic coke production facilities. China presently has capacity to produce 208.73 million metric tons of coke per year. Of this 173.73 million metric tons is from slot ovens and the remainder from bee hive ovens. In 2004 China produced 193.7 million metric tons of coke and 50 million metric tons was exported. Currently 180 coke ovens are being constructed in China with a combined production capacity of 60 million tons.

The price volatility experienced recently in China is a result of supply and export policies. In 2001 the cost of coke was $80/ton FOB to a Chinese port. In 2040 it was $410/ton. Currently it is $200/ton. In 2002 Chinese government decreased the number of coke export licenses to meet growing demand. It is anticipated that prices could stabilize at the $200/ton level. This would provide a clear incentive for the construction of additional coke production capacity.

BRIEF DESCRIPTION OF THE DRAWINGS

FIG. 1(b): Indiana/Illinois Coal Locations within the state of Indiana

FIG. 16: Coking Coal Blending Example according to one embodiment of the present invention.

FIG. 19(a): Pressure Loss predicted using the model of FIG. 17.

FIG. 19(b): Pressure Loss predicted using the model of FIG. 17.

FIG. 19(c): Pressure Loss predicted using the model of FIG. 17.

FIG. 20(a): Pressure Loss predicted using the model of FIG. 17.

FIG. 20(b): Pressure Loss predicted using the model of FIG. 17.

FIG. 20(c): Pressure Loss predicted using the model of FIG. 17.

FIG. 21(a): Pressure Loss predicted using the model of FIG. 17.

FIG. 21(b): Pressure Loss predicted using the model of FIG. 17.

FIG. 21(c): Pressure Loss predicted using the model of FIG. 17.

FIG. 22(a): Flow Lines for Various Coke Properties predicted using the model of FIG. 17.

FIG. 22(b): Flow Lines for Various Coke Properties predicted using the model of FIG. 17.

FIG. 22(c): Flow Lines for Various Coke Properties predicted using the model of FIG. 17.

DESCRIPTION OF THE PREFERRED EMBODIMENT

Figure 1A:
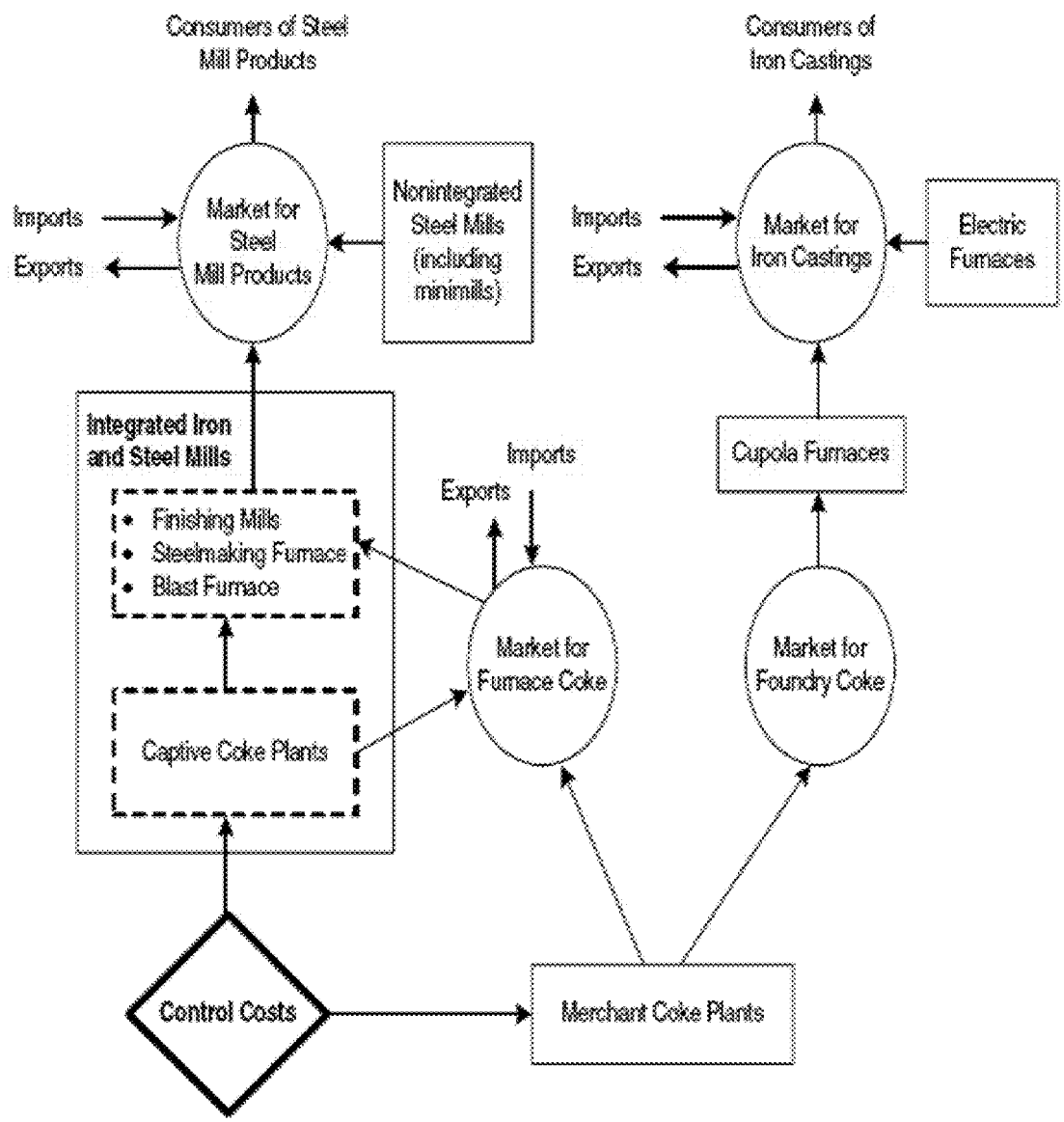
FIG. 1(a): Coke Market Linkages

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The use of an N-series prefix for an element number (NXX.XX) refers to an element that is the same as the non-prefixed element (XX.XX), except as shown and described thereafter. As an example, an element 1020.1 would be the same as element 20.1, except for those different features of element 1020.1 shown and described. Further, common elements and common features of related elements are drawn in the same manner in different figures, and/or use the same symbology in different figures. As such, it is not necessary to describe the features of 1020.1 and 20.1 that are the same, since these common features are apparent to a person of ordinary skill in the related field of technology. Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only. Further, in discussion pertaining to a specific composition of matter, that description is by example only, does not limit the applicability of other species of that composition, nor does it limit the applicability of other compositions unrelated to the cited composition.

Various embodiments of the present invention pertain to methods for producing coke. In some embodiments a recovery coke oven is fueled with a blend of different types of coals. One coal may be of a type typically used for the production of coke. The other coal may be of the type that includes compounds that produce volatile gases during pyrolysis. The volatile gases given off during pyrolysis are used in a separate economic stream, such as by producing electricity, a liquid fuel, fertilizer, or other uses of the gas. The coke produced during pyrolysis is a separate economic stream useful in the steelmaking process. Preferably, the blend ratio of the two coals is chosen to produce a sufficient quantity of both coke and the volatile gas (during subsequent pyrolysis) so as to achieve a desired profitability of the coke oven.

Yet another embodiment of the present invention pertains to a method for determining the best economic use of a recovery coke oven. The method includes the blending of two different types of coal. The first coal includes a volatile gas releasable during pyrolysis. The second coal is of a different type that includes less of the same volatile gas releasable by pyrolysis, and in some embodiments substantially less. The recovery coke oven is in fluid communication with the processing plant and is capable of producing electricity or capable of utilizing the volatile gas for a subsequent product. The method includes calculating the economic demand for at least two of the economic streams of the coke oven and deprocessing plant. The coke oven is operated at a temperature in excess of about five hundred degrees Centigrade and less than about eight hundred degrees Centigrade. The temperature of the oven is selected to produce a desirable quantity of the volatile gas. The two types of coal are blended based on knowledge of the future demand and the temperature at which the oven will operate.

Yet another embodiment to the present invention pertains to a recovery coke oven that includes a top of the oven that is adapted and configured it to substantially obstruct the introduction of oxygen into the top. In yet other embodiments, the oven is further adapted and configured to obstruct the flow from the sole plate. Further embodiments to the coke oven include a down corner to internally flow gas from near the top of the oven to near the sole of the oven.

A viable supply of iron is one mainstay of economies throughout the world. Issues associated with the supply and price of iron, which is used to produce steel, play either a direct or indirect role in all modern business operations. Indiana is home to approximately 22% of the base steel production for the United States and consequently there is enormous incentive to assure the supply, quality, and price of the raw materials that are used in its production. One of the major components used in the iron making process is coke.

World coal and coke market prices have recently been in a state of flux. Chinese Coke before the year 2000 was priced at about $50/t FOB Port. Since that time there has been extreme volatility in coke prices. In 2004 prices increased to $320/t FOB Port with subsequent prices of $180/t FOB Port in 2005, $150/t FOB Port in 2007, and estimates in early 2008 of up to $450/t FOB Port. This makes long term production planning difficult since coke is the costliest raw material in steel making.

Major products from a facility using a process according to one embodiment of the present invention are coke, electricity, liquid transportation fuel, and fertilizer and hydrogen. All are crucial to the economic future. The locations of various coal mines provide many unique advantages for coke production.

A prudent approach to this situation is not to have a standalone coke plant but a multipurpose coke facility in which multiple product value streams are optimized to reduce technical and economic risks. In such a coke plant, it would be possible to selectively extract pyrolysis gas to produce electricity, natural gas, liquid transportation fuels, fertilizer, and hydrogen in addition to coke. With this scenario in mind, a research project was initiated to consider the use of Indiana/Illinois Basin Coal for the production of coke at mine mouth or locally at a steel production facility in addition to other ancillary products. Initial results indicate that it is possible to use blended coal with up to 50% Indiana/Illinois coal in a non recovery coke oven to produce pyrolysis gas that can be selectively extracted and used for various purposes including the production of electricity, liquid transportation fuels, fertilizer and hydrogen. Since Indiana/Illinois coal is less expensive than conventional metallurgical coals, coking coal costs would be significantly reduced.

A multipurpose coke plant using Indiana/Illinois coal would help reduce the coke shortfall and lower the cost of coke produced. One embodiment of the present invention includes the development of a process that can provide at least a partial resolution and/or mitigation of this formidable problem through the use of Indiana/Illinois Basin coal in either a mine mouth or local, environmentally friendly, high efficiency coking/coal gasification facility. Such a process would increase coke supply and production, while, at the same time reduce coal costs. Some embodiments use an optimized blend of Indiana/Illinois Basin and conventional metallurgical coals to produce coke that has acceptable hot and cold strength and other physical and chemical characteristics as well as producing a gas stream that can be used for the production of additional products such as Fischer-Tropsch liquid transportation fuels, fertilizer, hydrogen, and electricity. Still other embodiments include methods to use nanoscale catalysis to reduce the carbon foot print of coking operations by producing salable chemical products from the produced carbon dioxide are also being considered.

Coke is a solid carbon fuel and carbon source used to melt and reduce iron ore. Coke production begins with pulverized, bituminous coal. In current operations, coal itself can not be used in place of the central placement of coke in a blast furnace because it would not form a permeable bed of sufficient strength and porosity to support the weight of material in the blast furnace.

Coal is fed into a coke oven which is sealed and heated for 14 to 36 hours to about 110° C. (2000 F). Coke is produced by heating particulate coals of very specific properties in a refractory oven in the absence of oxygen (or with limited oxygen at the top of the coal bed in the case of non recovery coke ovens). As temperature increases inside the coal mass, it melts or becomes plastic, fusing together as devolatilization occurs, and ultimately resolidifies and condenses into particles large enough for blast furnace use. During this process, much of the hydrogen, oxygen, nitrogen, and sulfur are released as volatile by-products, leaving behind a partially crystalline and porous carbon product. The quality and properties of the resulting coke is inherited from the selected coals, as well as how they are handled and carbonized in coke plant operations.

Heat is often transferred from one coke oven to another to reduce energy requirements. After the coke is finished, it is moved to a quenching tower where it is cooled with a water spray. Once cooled, the coke is moved directly to an iron melting furnace or into storage for future use. Currently little or no Indiana-type coal is used to produce coke.

Coke production is traditionally one of the major pollution sources from steel production. At present there are two main methods of producing coke. First, a recovery process in which the coal is heated in a reducing atmosphere and the volatile products are recovered in an associated chemical processing plant. Major issues associated with this process include the complexity of the chemical processing and the production of potentially hazardous compounds. There is also a major concern with the tar that is left after processing. This material is also potentially hazardous and is generally stored on site and thus presents a future disposal concern. The complexity of the chemical processing introduces added cost and process operational details that have restricted the use of this option in the past for coking and simultaneous power production.

Air emissions such as coke oven gas, naphthalene, ammonium compounds, crude light oil, sulfur, and coke dust are released from many coke ovens. Emissions control equipment can be used to capture some of the gases and heat can be captured for reuse in other heating processes. But, traditionally, some gases escape into the atmosphere as the coke oven ages. Air and water emissions from coke production can be reduced by using a non-recovery coke battery. In traditional plants, by-products can be recovered.

Figure 2:
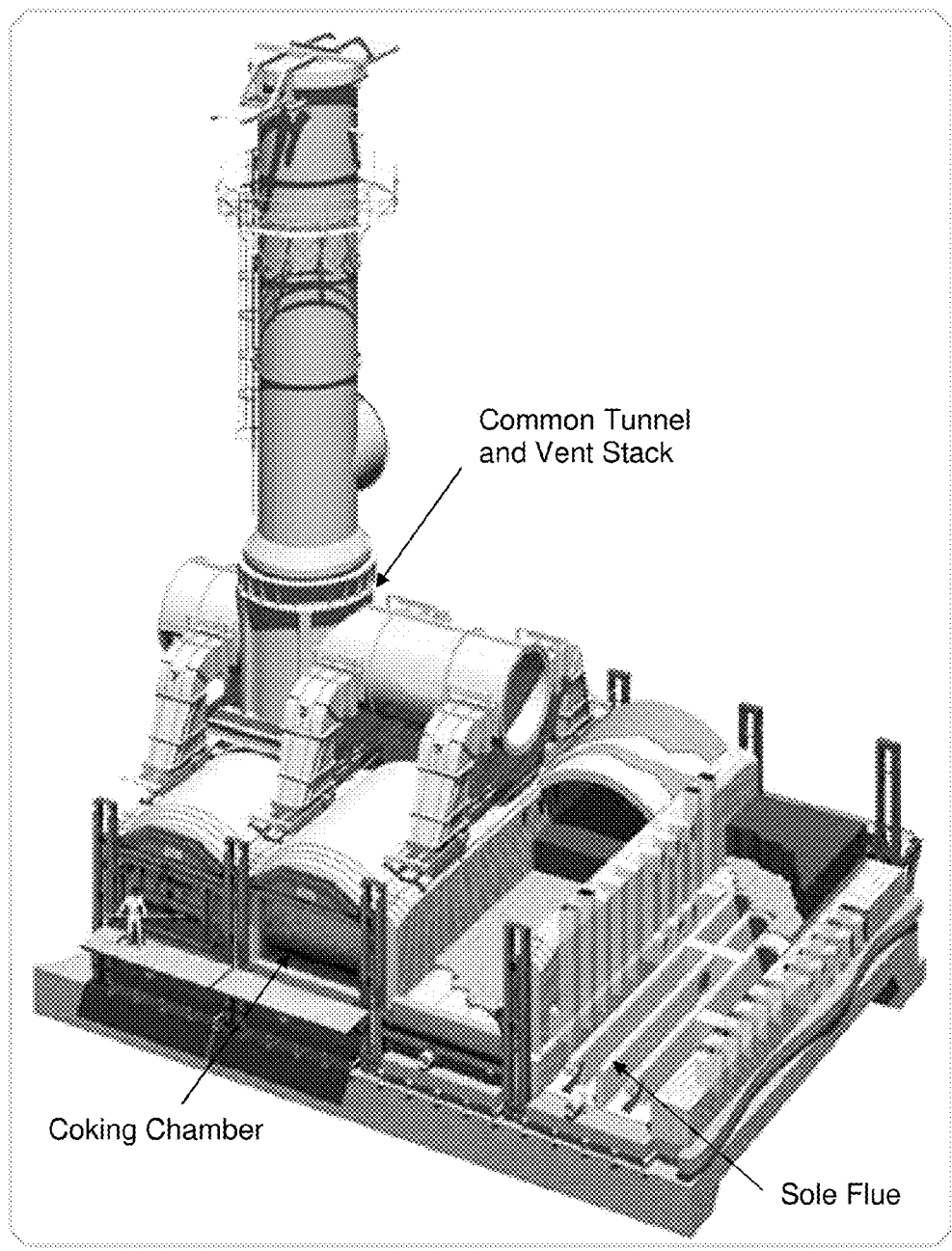
FIG. 2: Non Recovery Coke Oven and Sole Flue Orientation

In non-recovery batteries, pollutants are combusted in the coke oven itself, which is often maintained at a negative pressure. This technique consumes the by-products, eliminating much of the air and water pollution. In the non recovery process air is introduced above the top of the coke bed in the oven and the volatiles are combusted. The Environmental Protection Agency has stated that new ovens must meet non recovery standards. The hot gases from the oven can then be used in a heat recovery boiler to produce steam and subsequently generate electricity. Relatively small amounts of hydrogen are produced in this process and are recalculated to the bottom of the furnace to provide heat for the process. FIG. 2 depicts a non recovery coke oven.

One issue in blast furnace iron making is the strength of the coke. The coke produced from Indiana-type coal has less strength than coke produced from current metallurgical coal sources and consequently is smaller in size. This means that it will be used in upper portions of the blast furnace. Typical characteristics of coke used in blast furnace operations are shown in Table 1.

TABLE 1

Typical Blast Furnace Coke Characteristics

| | ean | Range |
|---|---|---|
| Physical: (measured at the blast furnace) | | |
| Average Coke Size (mm) | 2 | 45-60 |
| Plus 4" (% by weight) | | 4 max |
| Minus 1"(% by weight) | | 11 max |
| Stability | 0 | 58 min |
| CSR | 5 | 61 min |
| Physical: (% by weight) | | |
| Ash | .0 | 9.0 max |
| Moisture | .5 | 5.0 max |
| Sulfur | .65 | 0.82 max |
| Volatile Matter | .5 | 1.5 max |
| Alkali (K$_2$O + Na$_2$O) | .25 | 0.40 max |
| Phosphorus | .02 | 0.33 max |

The concept of locating a modified non recovery coking facility at a mine in Indiana or at an existing facility with energy recovery for the generation of electricity is practical. Extension of the technology to include gasification and local power production is also viable. There is a high potential to use Indiana/Illinois coal for coking as well as other industrial purposes both within and outside Indiana. A flow diagram of the concept according to one embodiment of the present invention is depicted in FIG. 5.

Figure 5:
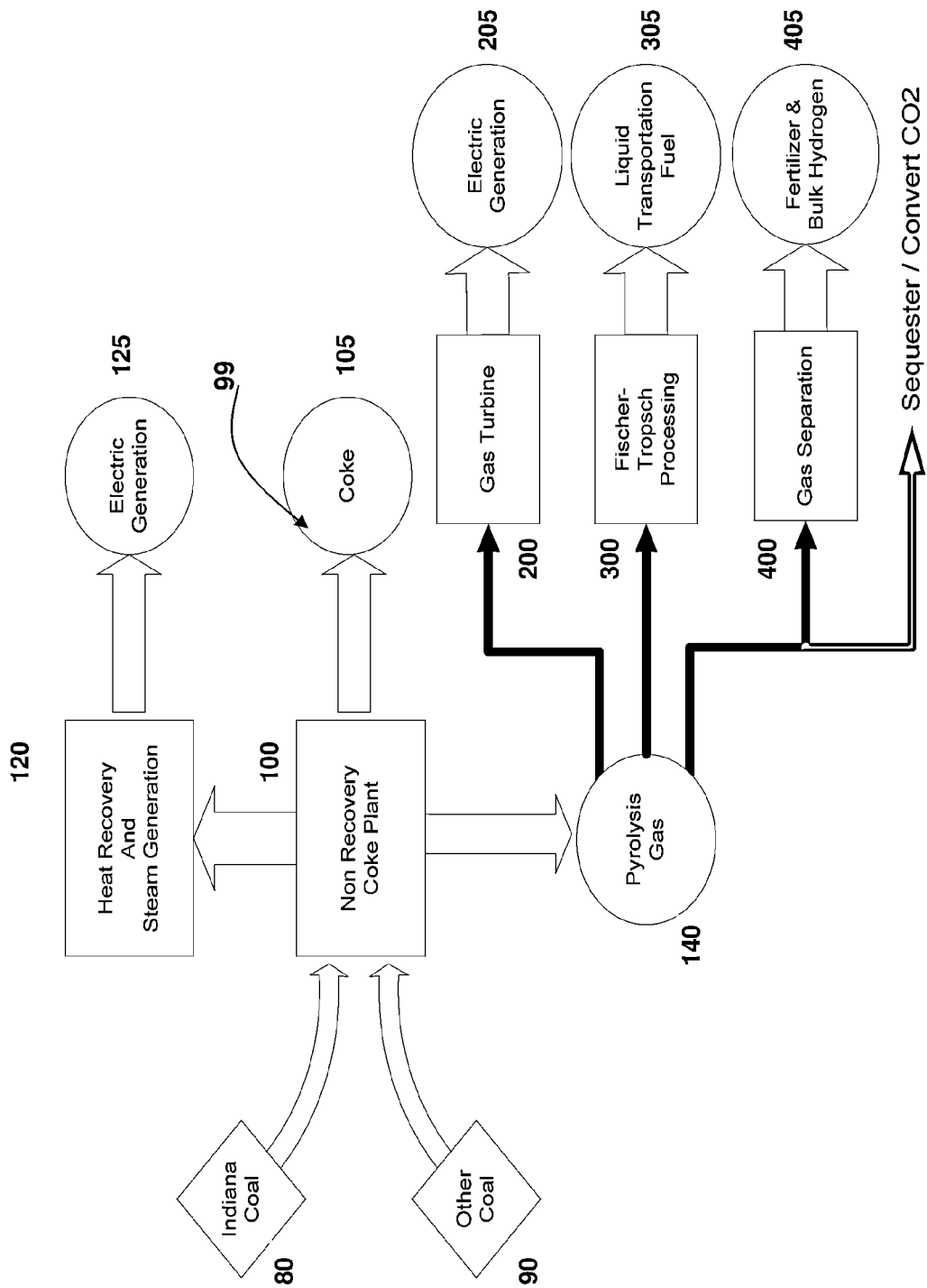
FIG. 5: Economic tradeoffs in determining how to blend different types of coal according to one embodiment of the present invention.
Figure 6:
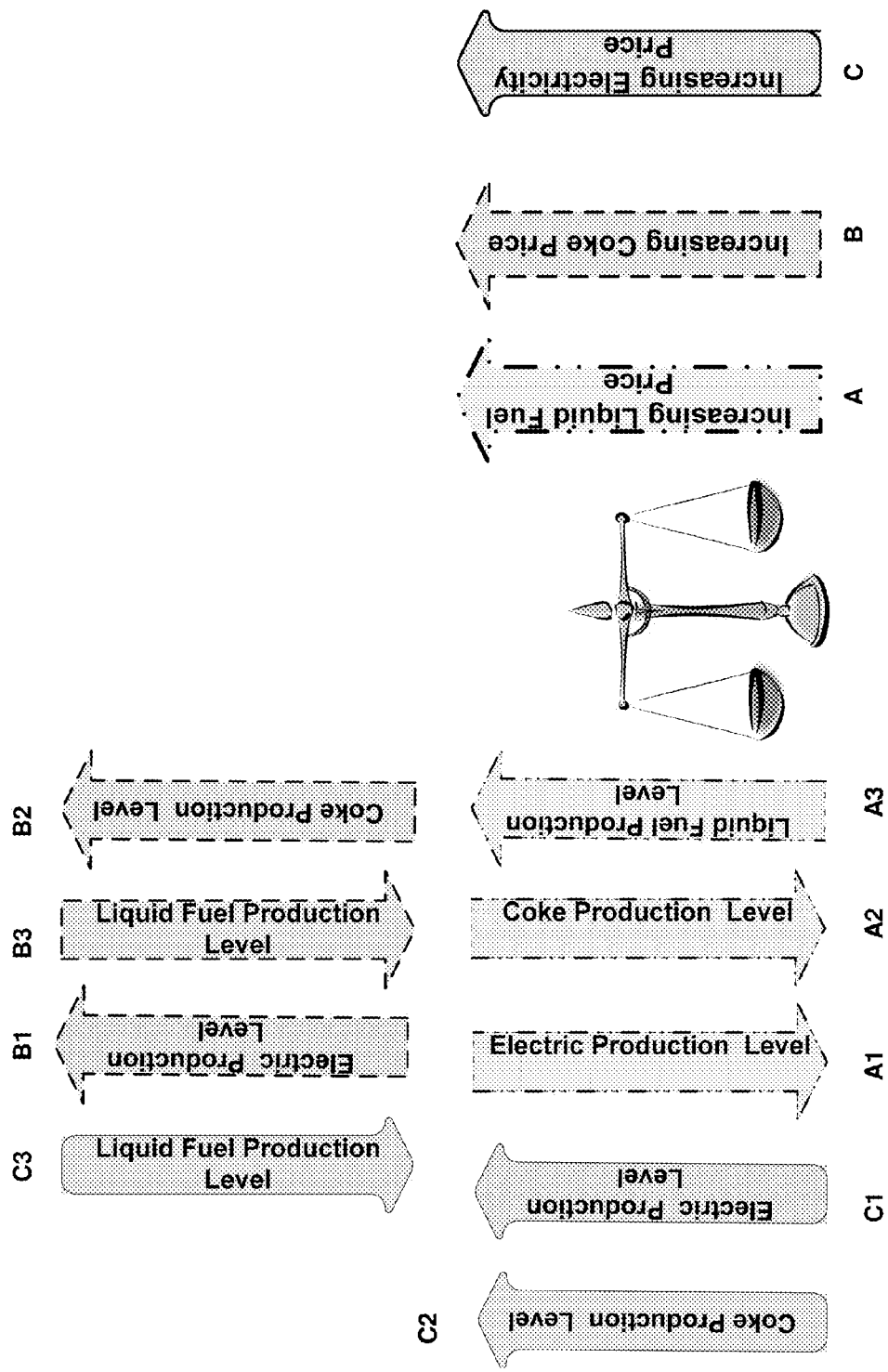
FIG. 6: Graphical representation of various economic tradeoffs of FIG. 5.

Referring to FIGS. 5 and 6, in one embodiment of the present invention the prices A, B, and C of liquid fuel, coke, or electricity (respectively, on the right of the scale) are used in determining the production levels of liquid fuel, coke, or electricity from system 99. System 99 is a schematic representation of a processing plant according to one embodiment of the present invention. System 99 includes a non-recovery coke plant 100 that receives inputs of both Indiana/Illinois Basin coal 80 as well as a quantity of coal 90 from a different source. In some embodiments of the present invention, coal 90 is provided from a remote mine with a substantially different type of coal than the Illinois/Indiana type of coal 80. In yet other embodiments, the other coal 90 is also Indiana/Illinois Basin type coal, but comes from a different mine than coal 80, and includes different structural characteristics and aliphatic components. Further, it is understood that reference to Indiana/Illinois coal includes those mines that have a vein within the geographic boundaries of Indiana or Illinois. In addition, it is recognized that the phrase "Indiana/Illinois" coal or "Indiana" coal (used interchangeably) refers to a type of coal defined herein, and are not necessarily limited to any geographic boundary. FIG. 1(b) is a map of Indiana showing some of the locations providing "Indiana/Illinois" type coal.

Figure 9:
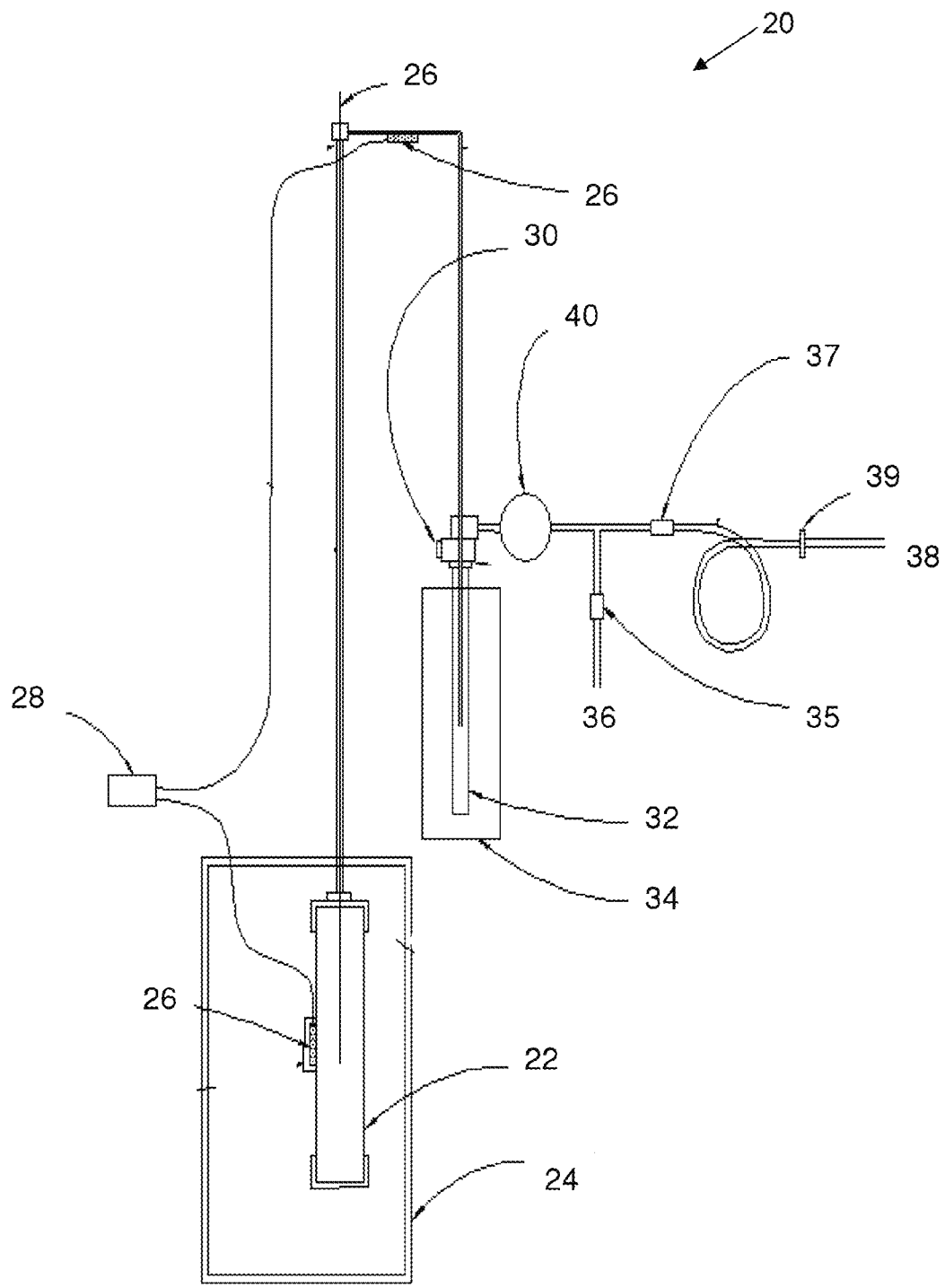
FIG. 9: Pyrolysis Gas Apparatus for analyzing coal according to one embodiment of the present invention.

Coke plant 100 includes output streams of coke 105, pyrolysis gas 140, and heat 120. The quantities of heat, coke and pyrolysis gas produced are selected based on the commodity prices A (liquid fuel price), B (coke price), and C (electricity price), and take into account the quantities of gaseous components that are released from the blend of coals 80 and 90 at the selected pyrolysis temperature. Determination of the aliphatic components of the coals 80 and 90, in one embodiment, is by an analysis apparatus 20 as shown in FIG. 9.

Waste heat 120 from recovery plant 100 can be used to generate steam and electricity from a steam-driven power plant 125. The coke 105 is used as an ingredient in the manufacture of steel. For those embodiments in which system 99 is located proximate to the mine from which coal 80 is extracted, coke 105 is subsequently transported to a steel processing facility.

The pyrolysis gas 140 can be used in any one or combination of a gas turbine 200, Fischer-Tropsch processing plant 300, or gas separation facility 400. Based on the commodity prices A, B, and C, the pyrolysis gas 140 can be combusted in a gas turbine 200 to produce electricity 205. Alternatively, and/or in parallel, the pyrolysis gas 140 can be used in the processing plant 300 to produce a liquid transportation fuel 305. Further, and alternatively and/or in parallel, the pyrolysis gas 140 can be separated in processing plant 400 into constituent parts. As examples, these constituent parts can be used to produce fertilizer 405.1 and/or bulk hydrogen 405.2.

As best seen in FIG. 6, the prices of commodities A, B, and C, as well as the rate of change of these prices, are factors in the decision regarding production levels and manner of operating system 99. For example, as the price A of liquid fuel increases, the existing output streams 105, 140, and 120 are changed so that the amount of electricity produced A1 and the amount of coke produced A2 tend to be decreased, and the amount of liquid fuel A3 produced from plant 300 tends to be increased. With regards to commodity B, an increase in the price of coke presents tradeoff factors that favor increasing levels of coke production B2 (such as from the use of a higher temperature in plant 100 so as to speed the production of coke), with a commensurate increase in the level of electricity produced B1 (via heat recovery 120 and electric generation 125), and a general decrease in liquid fuel production B3 (as conditions within coke plant 100 become less favorable for the production of pyrolysis gas 140). As another non-limiting example, an increase in the price of commodity C for electricity likewise favors an increase in electrical production C1 (from generators 125 and 205), an increase in coke production levels C2, and a decrease in liquid fuel production levels C3 through plant 300.

Figure 10:
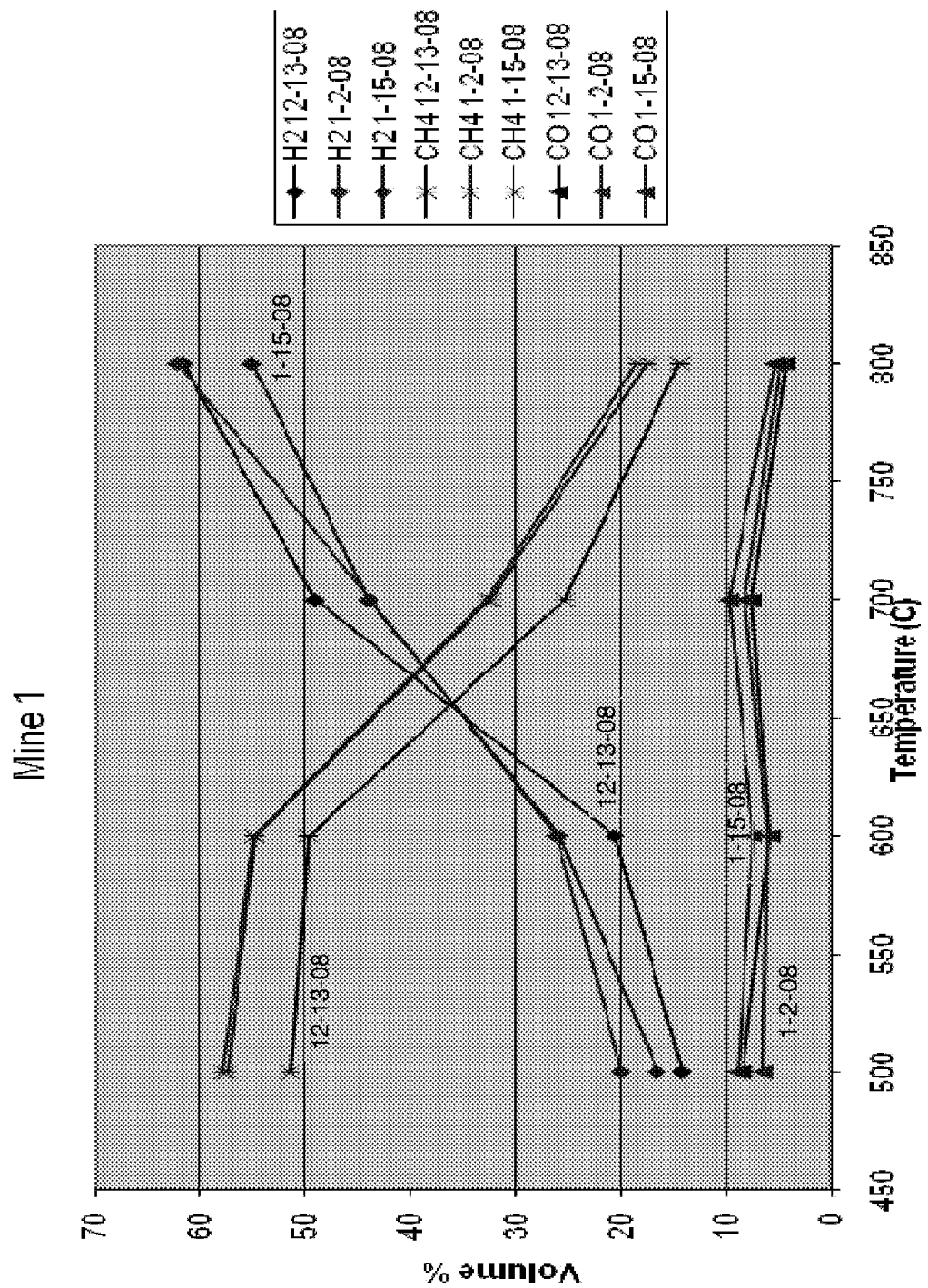
FIG. 10: Pyrolysis Gas Analysis, Mine 1, according to one embodiment of the present invention.
Figure 11:
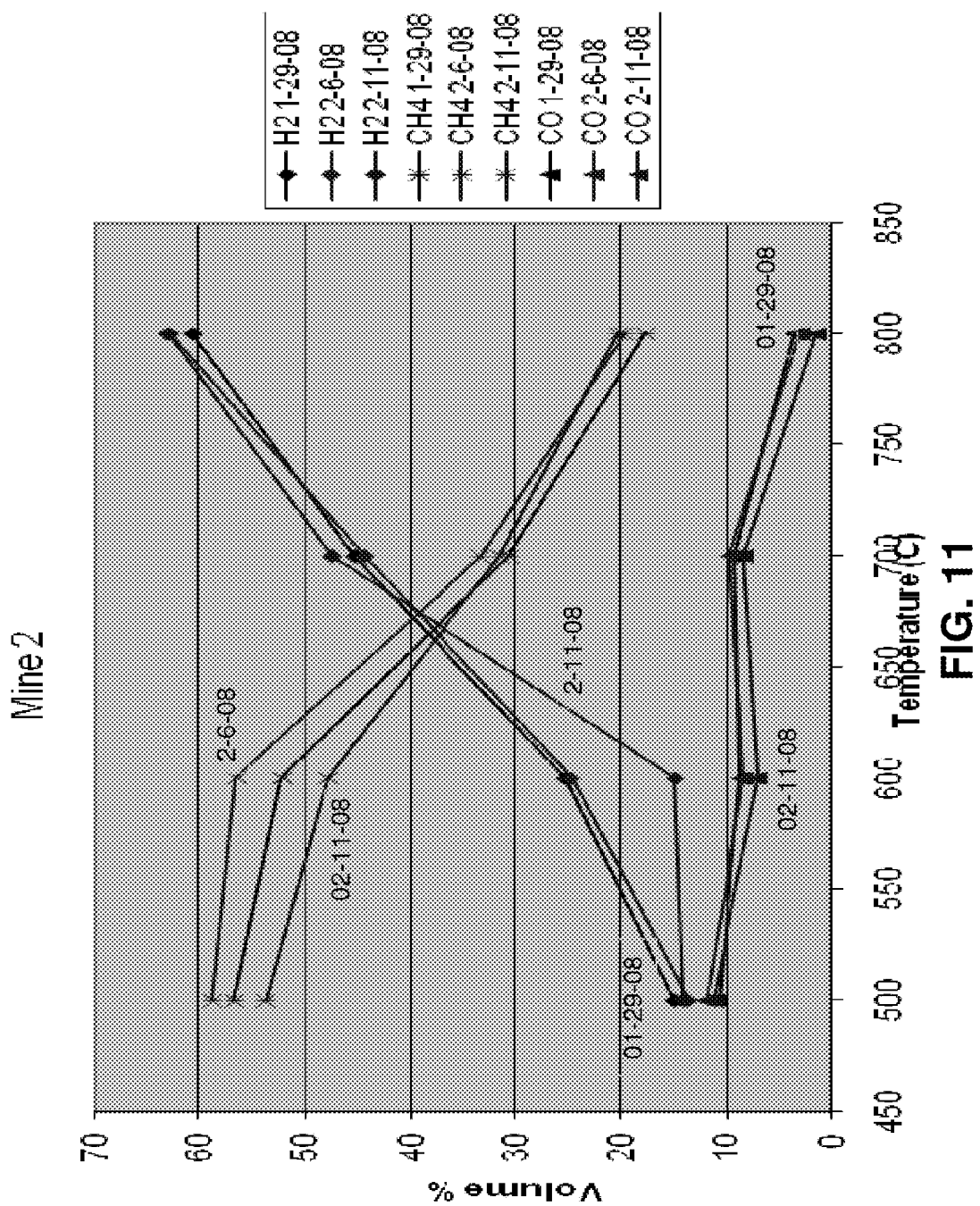
FIG. 11: Pyrolysis Gas Analysis, Mine 2, according to one embodiment of the present invention.
Figure 12:
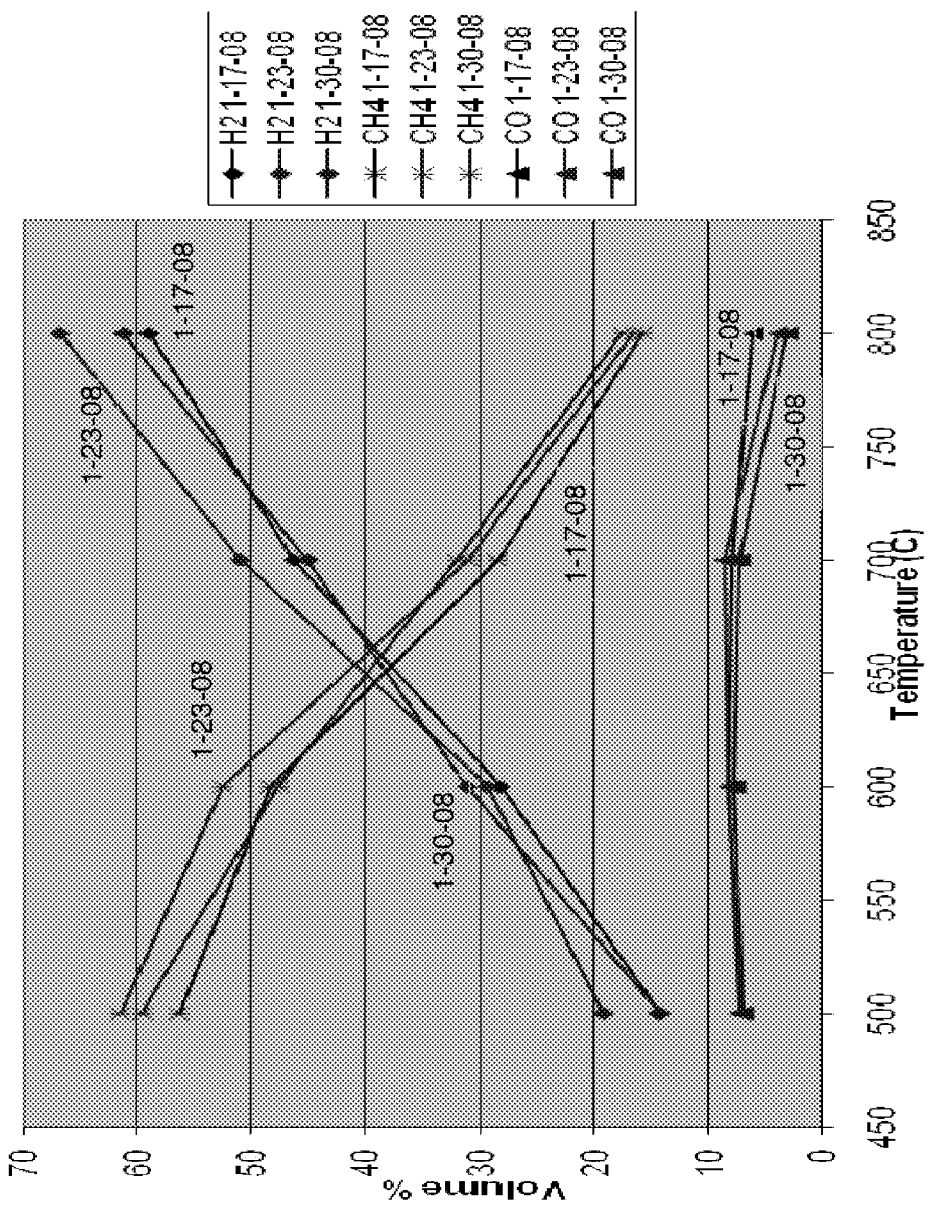
FIG. 12: Pyrolysis Gas Analysis, Mine 3, according to one embodiment of the present invention.

Further, note that system 99 can produce electricity either by the use of steam processing plant 120 driving generator 125, and further by the combustion of pyrolysis gas 140 within gas turbine 200 that drives electric generator 205. As to the desired split in electrical production between generator 125 and generator 205, the volatile constituents (especially methane gas and hydrogen gas) of the blend of coals 80 and 90 are considered. As one example, with regards to increases in the price of coke, it may be preferable to operate plant 100 at a high selected temperature, and use the waste heat to generate steam. However, if the blend of coals 80 and 90 include relatively high amounts of methane, it may be desirable to run at a lower temperature which, as best seen in FIGS. 10-12, increases the amount of methane produced, which can then be used as a fuel in gas turbine 200.

It is understood that although the tradeoffs of system 99 have been described in terms of prices and levels, the tradeoffs can also be thought of in terms of directions, such as increasing and decreasing from known operating conditions. Further, the terms increase and decrease can be viewed in a relative context (i.e., changing the operation of system 99 to decrease coke production can be viewed as relative increases in heat production or production of pyrolysis gas).

In one embodiment, the coal used for the proposed coking process is a mix of Indiana Brazil Seam or potentially other Indiana coals, as previously identified by the Indiana Geological Survey, blended with other coals to meet metallurgical and emissions requirements. This approach has been used successfully to dramatically increase coke quality.

Coke produced from Indiana coal has less strength than coke produced from conventional metallurgical coal and this results in coke sizes that fall into two general classes. One class, often referred to as Nut coke, is on the order of 1 inch×¼ inch as compared to conventional blast furnace coke which is on the order of 1 inch×4 inches. The other class is called coke breeze and is much finer. It is used as a source of carbon in steel making, for palletizing, sintering, as well as in the elemental production of phosphorous. It can also be made into briquettes and used to feed blast furnaces in combination with iron ore pellets. Other industries that use coke breeze include cement, paper, fertilizer, as well as others. Nut coke is classically used in the steel industry as a carbon source for electric furnaces, in the production of ferromagnesium and ferrosilicon products, and in the production of elemental phosphorous.

One embodiment of the present invention includes a mixture of Indiana Brazil Seam-type or potentially other Indiana-type coals, as previously identified by the Indiana Geological Survey, that are blended with other coals to meet metallurgical coke quality and emissions requirements.

In another embodiment, it is feasible to establish a novel coke production process at a coal mine or steel facility. The process includes the value of some emissions credits, due to the "clean coal technology" as well as the different geographic location.

In a further embodiment, the total transportation cost can be reduced, since the mass of the product coke is less than the coal needed to produce it and also because coke is less dense than coal. Thus, a cost savings from the reduced weight per mile of material being transported results.

Some embodiments contemplate a coking/coal gasification process that produces metallurgical grade coke using about 20%+ Indiana-type coal and, at the same time, produces a byproduct gas stream that is usable in a cogeneration facility for the production of electricity to be sold in the electric market. By using a new blending approach that optimizes coke properties and pyrolysis gas composition it is possible to increase the percentage of coke produced from Indiana coal blended with coke from other coals in blast furnace operations.

Producing combustible gases from solid fuels has been done since ancient times. Pyrolysis is a process in which feed material is heated with little air present. Synthesis gas is produced with partial oxidation of the feed material. The coke oven was developed for the metals industry in order to provide a substitute for charcoal during the second half of the eighteenth century. Towards the end of the eighteenth century gas was produced from coal by pyrolysis on a larger scale. In 1812 the London Gas, Light, and Coke Company commercialized gas production. One gas produced at this tie was Town Gas. Town Gas can be produced by pyrolysis (producing gas with a heating value of 20,000-23,000 kJ/m$^3$) or by the water gas process (coke is converted into a mixture of equal parts of hydrogen and carbon monoxide with a heating value of approximately 12,000 kJ/m$^3$). Converting part or all of the carbon monoxide into hydrogen produces synthesis gas. This can then be used in Fischer-Tropsch processes for the synthesis of hydrocarbons or acetic acid anhydride. It this context, blast furnaces can be considered to be large gasifiers of coke.

In a recovery coke oven, typically the coke oven gas has a composition of 58% hydrogen, 26% methane, 5.5% nitrogen, 2.25% acetylene, 2% carbon dioxide, 6% carbon monoxide, and 0.25% oxygen. One metric ton of coal typically produces 600-800 kg of blast-furnace coke and 296-358 m$^3$ of coke oven gas.

Figure 7:
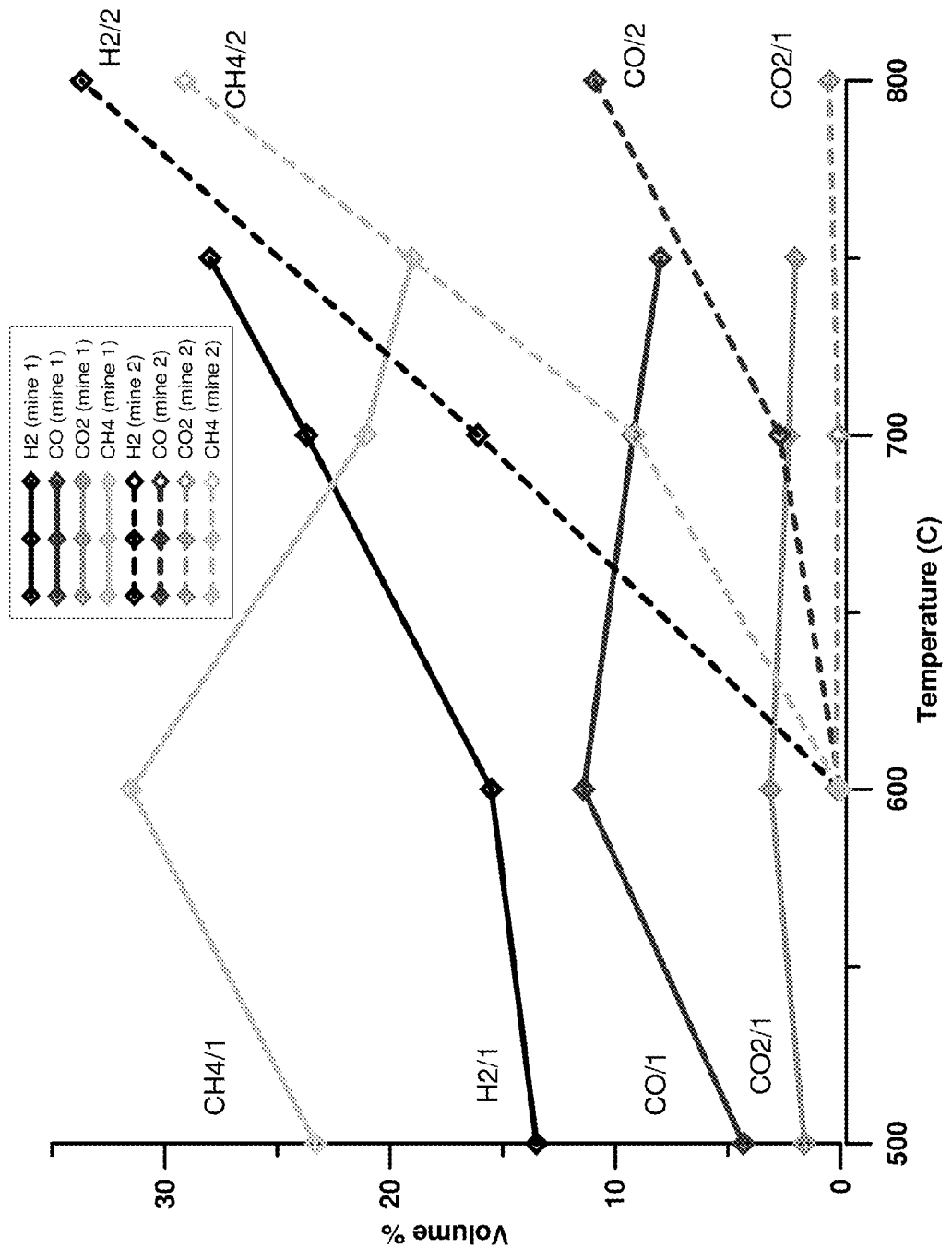
FIG. 7: Gas Composition vs. Temperature for various types of coal according to one embodiment of the present invention.
Figure 8:
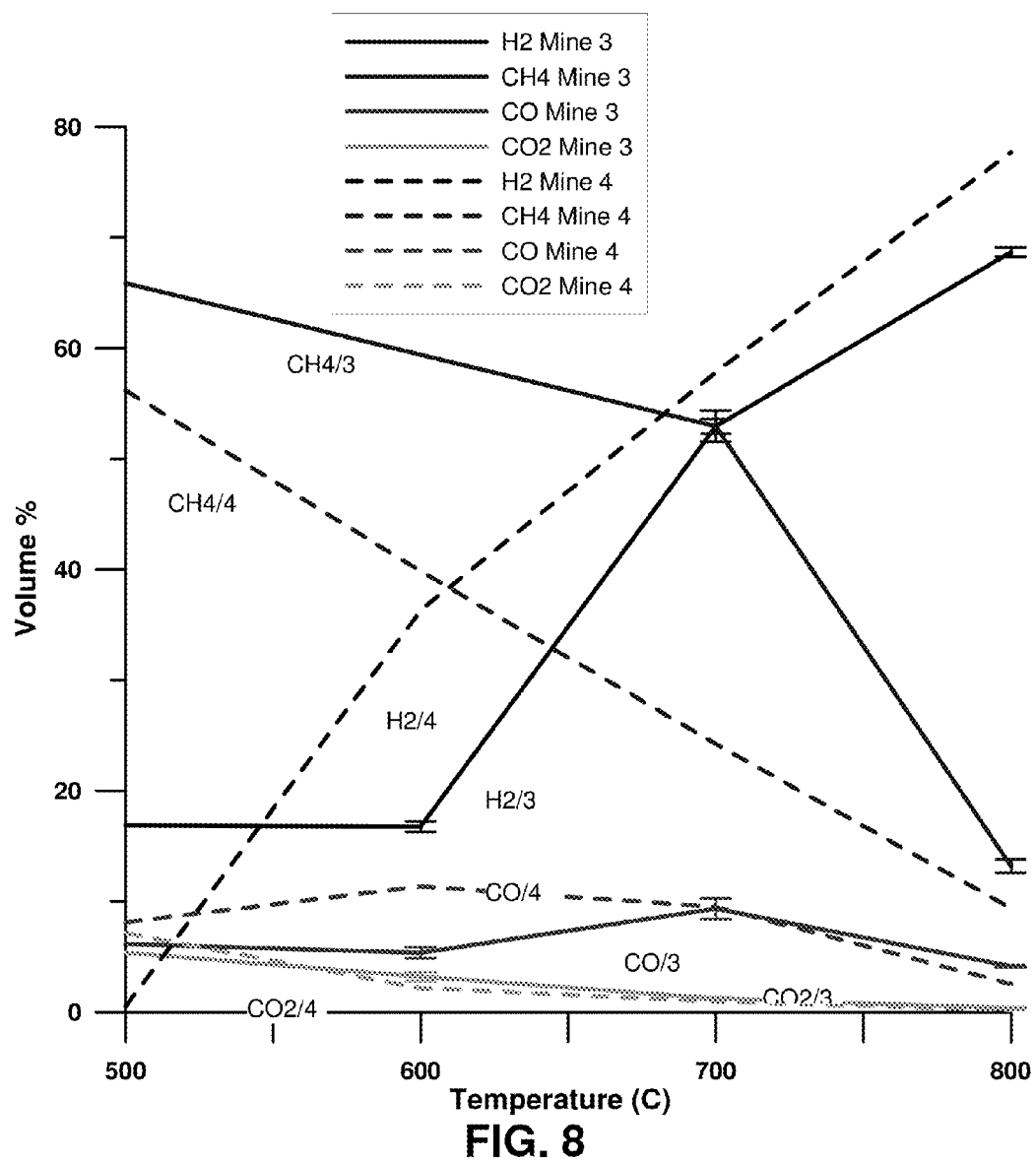
FIG. 8: Gas Composition vs. Temperature for various types of coal according to one embodiment of the present invention.

This hydrogen content is typically too high for use directly in Fischer-Tropsch processes. Methods to reduce this to the range of 2-4 to 1 hydrogen to carbon monoxide ratio, possibly by combining with syngas streams, will be considered. Other processes for removing various constituents from the gas stream including oil, sulfur, and naphthalene will also be considered. It is also possible to adjust this ratio by blending various coals as is shown in FIGS. 7 and 8. One embodiment of the present invention includes a scheme that maximize both coke properties and pyrolysis gas composition.

One byproduct of the technology is electricity. It is desirable to consider associated electric system issues in optimizing the value of generated. Issues regarding integration of the unit into a local control area will need to be addressed as well as any concerns with ancillary electric system services.

The shortfall of needed coke has placed an enormous strain on Indiana's steel and foundry industries. The need for additional coke production capacity is evident given plans for coke plant expansion being considered by Indiana's steel industry and others. Coke supply and high price volatility issues can be mitigated through the use of Indiana coal in a mine mouth or local, environmentally friendly, high efficiency multi purpose coke, liquid transportation fuel, fertilizer, and hydrogen production facility. Such a facility would also increase coke supply and production, while, at the same time, reducing the cost for Indiana's steel and foundry industry. In addition, such a high efficiency coking facility would produce electricity for sale to the wholesale electric market, thereby reducing costs and environmental emissions and, at the same time, enhancing electric system reliability.

One metric ton of coal typically produces 600-800 kg of blast-furnace coke and 296-358 m$^3$ of coke oven gas. Preliminary it is estimated that from 0.1-0.25 barrels of liquid transportation fuel could be produced from each ton of coal used in the coking process. Much of the pyrolysis gas from coal arises from the contained aliphatic material. This gas consists of various amounts of hydrogen, methane, carbon monoxide, nitrogen, acetylene, and carbon dioxide. The composition of the pyrolysis gas changes as the coal is heated. For example, hydrogen concentration increases with increasing temperature. Depending on its composition, Pyrolysis gas can be used in Fischer-Tropsch processes for the synthesis of liquid transportation fuels. Producing gas from coal or coke is common in the steel industry and hence new methods to maximize the value of this important material can be most beneficial. There is much discussion today about methods to produce gas from coal. It should be noted that the steel industry has been actively involved in gasifying coal and coke for over 100 years. In this context, blast furnaces can be considered large gasifiers of coke.

Other embodiments of the present invention include utilizing the pyrolysis gas generated from a coke oven feed with a blend of Indiana-type and other coal to produce electricity, liquid transportation fuels by means of a Fischer-Tropsch process, fertilizer, and hydrogen. It is also possible to enhance this process with nano catalysis technology. There are also indications that it is possible to isolate carbon dioxide from the process and use it to produce a marketable chemical product with nano catalysis technology.

One way to increase the percentage of Indiana coal used for coke production includes blending. One approach is to blend different types of coals until a mixture is obtained that meets the coke quality requirements. Efforts to extend the blending to also consider optimizing the composition of the pyrolysis gas produced in the coking process are included. By optimizing both aspects simultaneously it will be possible to obtain coke of acceptable quality for use in blast furnaces and other applications and at the same time obtain a supply of pyrolysis gas that can be used for the production of liquid transportation fuels through the use of the Fischer-Tropsch process, and possibly fertilizer bulk hydrogen.

Preliminary laboratory tests of several Indiana coals were conducted to determine the suitability of Indiana coal for purposes of producing liquid transportation fuels, fertilizer, and hydrogen as part of the coke production process. As the temperature of the coal is increased in the coke production process pyrolysis gas of varying composition is released. In one embodiment portions of this gas are gathered from the coke process at specific temperature ranges with the proper composition for the production of liquid transportation fuels, fertilizer, and hydrogen. FIGS. 7 and 8 depict test results and show the gas composition from various Indiana coal sample at different temperatures.

The gas from the coal samples was produced in an apparatus 20 developed as one embodiment is depicted in FIG. 9. A device has been developed to facilitate the testing of pyrolysis gas from various coal samples. This device is constructed of 316 stainless steel with the exception of the vapor traps which are copper.

| 22 | 316 Stainless Steel Pipe Test Vessel |
|----|--------------------------------------|
| 24 | Furnace |
| 26 | Thermocouple |
| 28 | Recorder |
| 30 | Gas Sampling Septa |
| 32 | Copper Tube |
| 34 | Ice Bath |
| 35 | Valve |
| 36 | Vacuum Pump |
| 37 | Low Pressure Check Valve |
| 38 | To Exhaust |
| 39 | Micro Check Valve |
| 40 | Pressure/vacuum Gauge |

Coal samples 22 are placed in the test vessel 1. A vacuum is then drawn to test the seals of the system and the system is backfilled with dry nitrogen. This process is repeated twice to assure removal of air from the system. The vessel is then heated in the furnace 5. At various temperatures a partial vacuum is momentarily drawn on the system and pyrolysis gas from the coal 22 at that temperature refills the apparatus. Gas is then extracted from the apparatus at the particular temperature with a gas tight syringe through the sampling septa 6 and is analyzed in a gas chromatograph. Representative results for three different coal samples from Indiana are depicted in FIGS. 10, 11 and 12. The samples were split 3 ways and tested on different days.

As can be observed in FIGS. 10, 11 and 12, the composition of the pyrolysis gas varies with temperature for each type of coal. For a Fischer-Tropsch process producing a product that can be converted to liquid transportation fuel, a ratio of hydrogen to carbon monoxide of up to 4 to 1 is acceptable with an iron catalyst. Pyrolysis gas from the tested coals in the temperature range of 500-700 C could be readily used for such a process. The temperature range could be extended further by post processing if needed. A coal blending methodology is currently under development that will simultaneously optimize coke physical and chemical properties, such as CSR, as well as pyrolysis gas composition. By blending various coals it will be possible to adjust the temperature ranges over which the pyrolysis gas can be used for different purposes including production of liquid transportation fuels, fertilizer, hydrogen, and electricity. The coal blend will be optimized to maximize the value for the various products depending on market conditions at the time. The blending process is being optimized to maximize the value of both the coke and gas streams while minimizing coal costs. A graphic representation of the process is depicted in FIG. 6.

Figure 13:
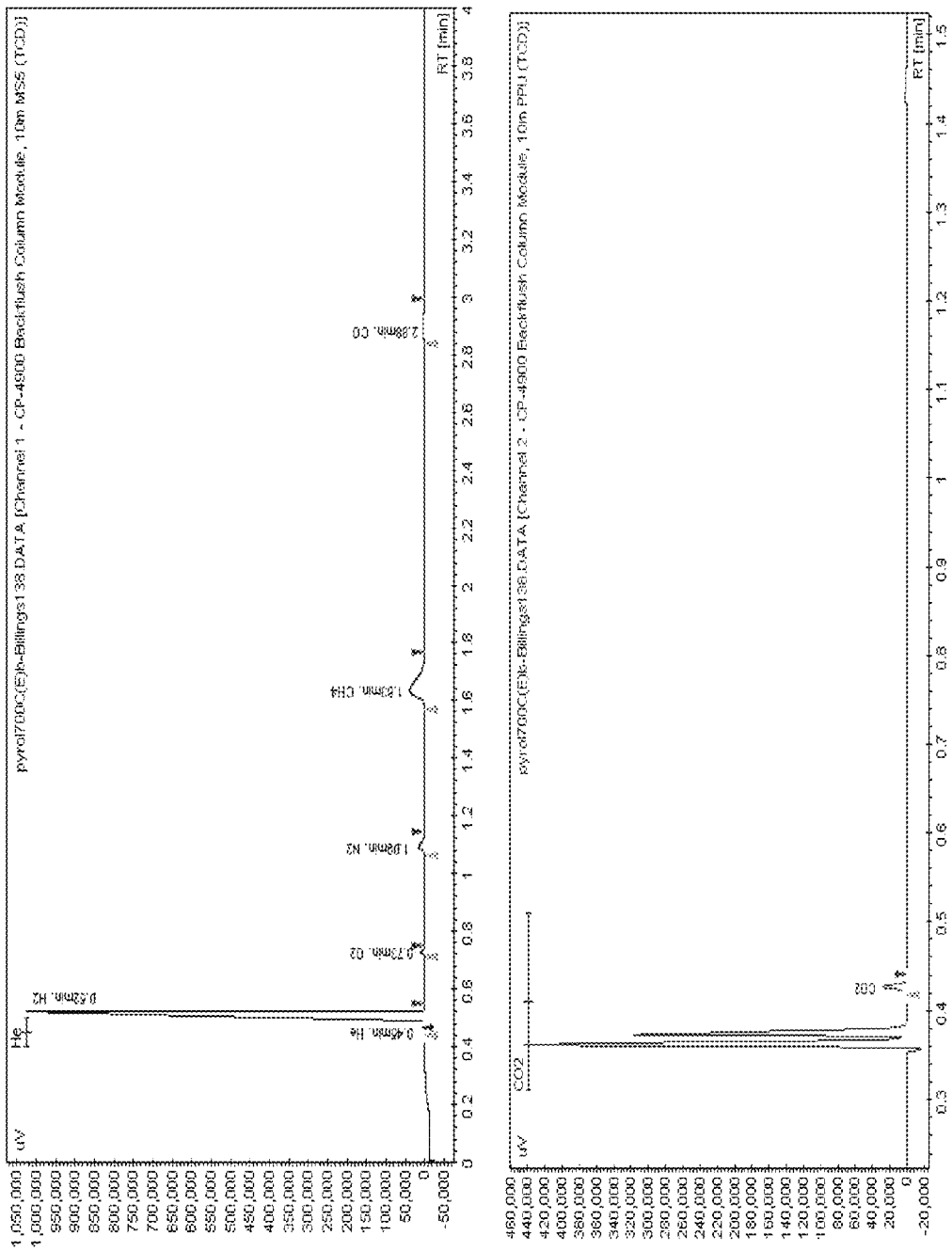
FIG. 13: Gas Chromatogram results for a type of coal.
Figure 14:
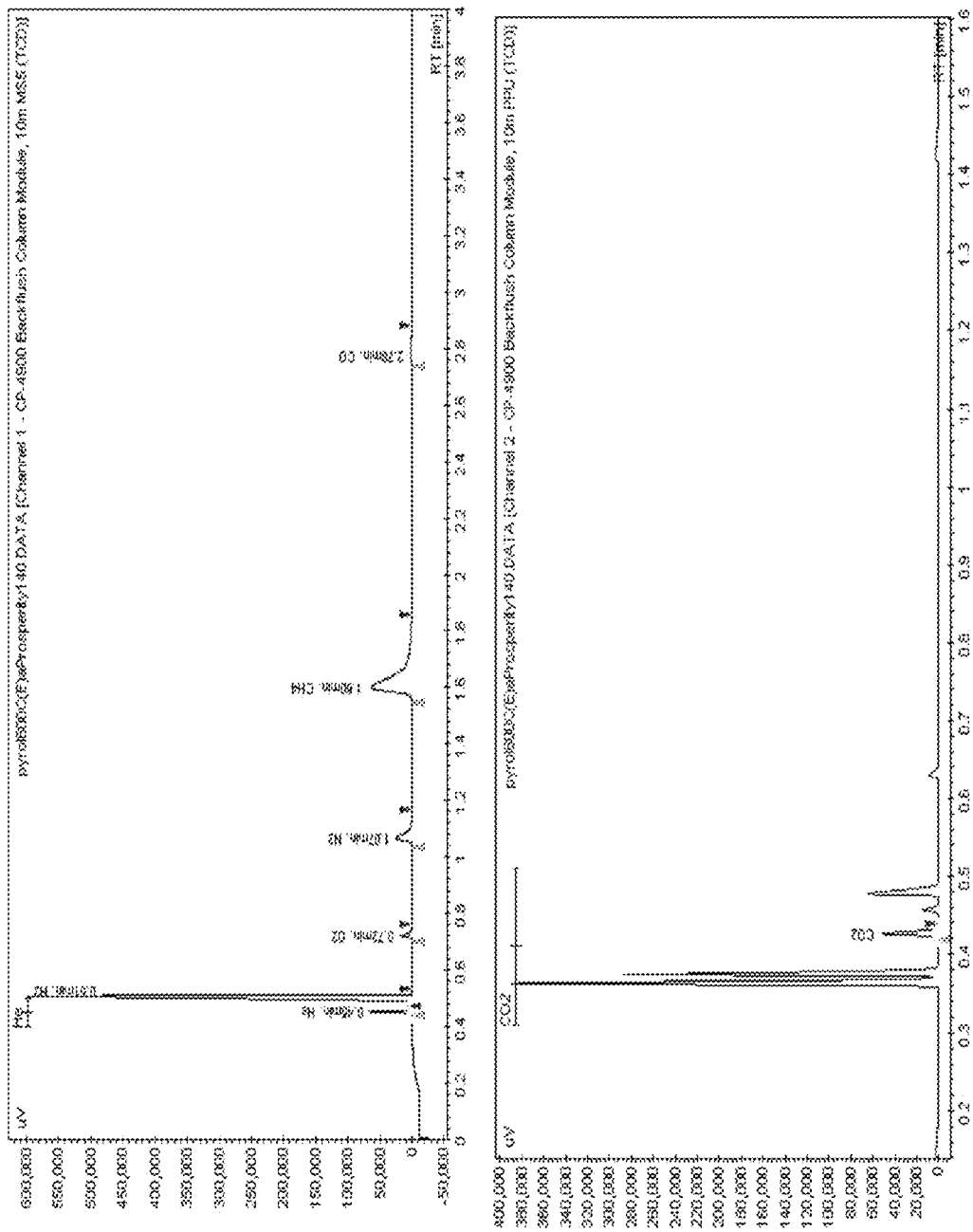
FIG. 14: Gas Chromatogram results for a type of coal.
Figure 15:
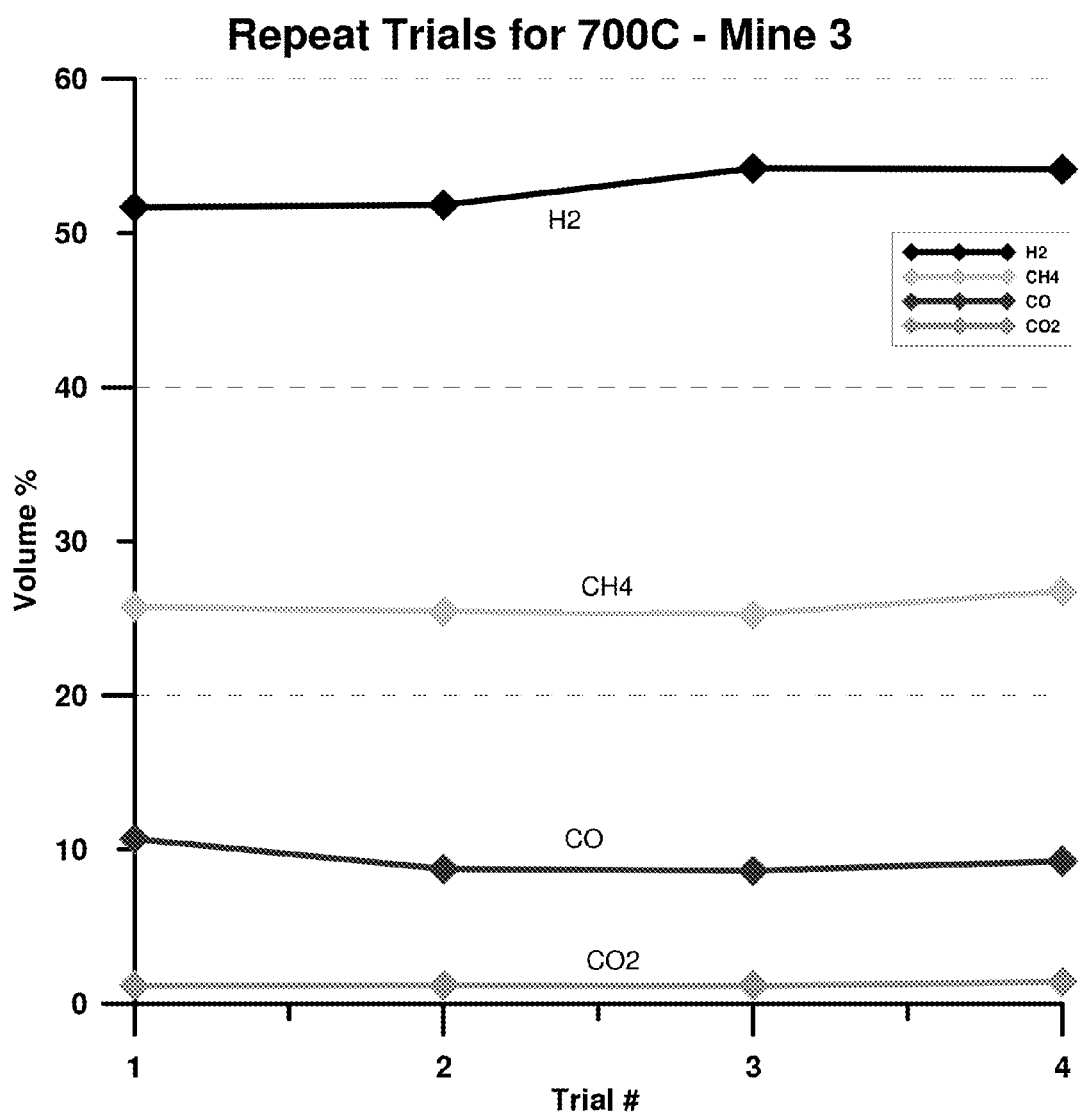
FIG. 15: Repeated Trials of gas analysis according to one embodiment of the present invention.

The gas produced in the apparatus depicted in FIG. 9 was analyzed in a gas chromatograph. Samples of chromatograms from the analysis are shown in FIGS. 13 and 14. FIG. 15 shows the results of repeated samples for one pyrolysis sample and indicates that the sampling procedure produces repeatable results.

A metallurgically compatible sample of an Indiana-type coal such as Indiana Brazil seam coal was obtained from Solar Sources. This coal was analyzed by the coke laboratory at US Steel in Gary, Ind. Results of this analysis are shown in Table 2. As can be observed from the data in this table, this particular coal when blended with other metallurgic coal would be suitable for blast furnace coking purposes.

TABLE 2

| Purdue Coal Sample | % |
|---|---|
| Moisture Content | 2.38 |
| Size Analysis | |
| +1¼" | 8.8 |
| +1" | 15.8 |
| +¾" | 25.9 |
| +½" | 40.1 |
| +¼" | 59.6 |
| +⅛" | 12.9 |
| Mean size | 1.44 |
| Proximate Analysis | |
| Volatile Matter | 37.08 |
| Fixed Carbon | 53.62 |
| Ash | 9.30 |
| Sulfur Content, % Dry | 0.76 |
| Oxidation Text (% Trans.) | 97.0 |
| Petrographic Analysis | |
| V-Types | |
| 3 | 0.4 |
| 4 | 11.5 |
| 5 | 55.0 |
| 6 | 33.0 |
| 7 | 0.1 |
| RO | 0.57 |

In addition to the nature of the gas produced during the coke process, the produced coke should meet standards for its use in blast furnace or other applications. One method to obtain the proper coke properties is through the blending of various types of coal.

An example of three types of coal blends used by the Japanese Steel Industry in 1975 for coke production is depicted in FIG. 15.

One way to rank coals is by the amount of volatile matter they contain. At the simplest level, mid-range prime coking coals will produce acceptable coke and the farther a particular coal is away from prime coking coal, the less suitable it is. Coke from high volatile coals tends to be too weak and reactive to be used in the blast furnace. Also, carbonizing low volatile coals can produce unacceptably high pressures on oven walls for slot ovens.

When coal is viewed under a microscope, it can be seen to be composed of three main components, or macerals, analogous to the minerals found in rocks. The first of these, vitrinite, softens on heating. It in association with the other components, liptinite and inertinite, forms the coke matrix. These components reflect light at different intensities. In general, the reflectance of the vitrinite is a measure of the rank of the coal and is inversely proportional to the volatile matter content. Usually a coal blend for blast furnace coke should have a reflectance between 1.25% and 1.35%. The reflectance of coals blends tends to vary linearly, but having the average reflectance of a blend in this range is not sufficient to assure that the produced coke will have the desired qualities. For this reason the reflectance distribution is considered.

If the reflectance values from a sample are plotted in a histogram, it is desirable to have a distribution that resembles a normal distribution with not too large a standard deviation. Unacceptable distributions have large standard deviations or have multiple peaks. Attempts at using simple linear programming models to determine coal blends for coking have produced varying results due to the complexity of the coking process. Modeling also considers other characteristics such as dilatation and fluidity, which provide empirical measures of the extent of softening and fusion on heating, in the blending process.

Two examples of coke quality produced via pilot oven carbonization using Indiana-type coal are given in the Table 3:

TABLE 3

Examples of Coke Quality

|  | 100% Indiana (Brazil Block Coal) | 100% Indiana (Danville, No. 7 coal) |
| --- | --- | --- |
| Coke Stability | 33 | 33 |
| Coke Hardness | 54 | 69 |
| CSR* | 48 | 30 |
| Coke size, mm | 53 | 55 |
| Coke yield, % | 67.9 | 67.0 |
| Coking Time, hr | 18.6 | 20.15 |
| Max. Pressure, kpa** | 2.07 | 2.96 |

(Note: CSR* = Coke strength after reaction with CO2, Max Pressure** = maximum oven wall pressure)

Due to the physical characteristics of Indiana coal, the coke produced will tend to be of a smaller size, but there are many opportunities to use this type of coke in blast furnace and other operations. The size of this coke is in two general classes. Nut coke, on the order of 1 inch×¼ inch as compared to conventional blast furnace coke which is on the order of 1 inch×4 inches. The other class is called coke breeze and is much finer.

Indiana/Illinois Basin coals are highly suitable for gasification and can produce good quality coke, especially when blended with other coals or lower quality coke if carbonized alone. Some of these coals when analyzed petrographically under white light and fluorescence light show higher amounts of exudatinite, sporinite, and cutinite macerals, all grouped as Liptinite in Table 4. Liptinite is reported to give higher liquefaction yield than associated vitrinite maceral. Liptinite contributes to higher hydrogen and higher liquid fuel yield. Additional hydrogen contributes to higher fluidity resulting in enhancement of coking properties. Hence, some Indiana/Illinois Basin coals are good candidates for coke making and production of pyrolysis gas.

TABLE 4

Liptinite Content in White Light and Fluorescence Light

|  | % Liptinite (White Light) | % Liptinite (Fluorescence Light) |
| --- | --- | --- |
| Indiana Coal (c) | 7.40 | 14.40 |
| Indiana Coal (R) | 7.20 | 10.80 |
| Indiana Coal (a) | 8.0 | 9.40 |
| Indiana Coal (LFC) | 23.6 | No Data |

Two examples of coke quality produced via pilot oven carbonization using Indiana and Illinois coals (as a single component and as blended components) are given in Table 5 and 6:

TABLE 5

Carbonization Pilot Oven Test Results of 100% Indiana and Illinois Coals

|  | 5-RL | 7-MC | 6-AQ |
| --- | --- | --- | --- |
| Coking Parameters |  |  |  |
| Moisture (%) | 7.42 | 8.0 | 11.2 |
| Grind (%, −3.55 mm) | 89.2 | 80.8 | 85.0 |
| D.O.B.D. (kg/m3) | 776 | 737 | 739 |
| M.O.W.Pressure (kpa) | 5.44 | 2.20 | 2.96 |
| C. Time (h) | 18.62 | 17.9 | 20.15 |
| Coke Properties & Charge Contraction |  |  |  |
| Stability | 31 | 25 | 33 |
| CSR | 27 | 46 | 30 |
| Hardness | 71 | 65 | 69 |
| C Size (mm) | 48.5 | 57.8 | 55.1 |
| C Yield (%) | 67.9 | 60.1 | 67.0 |
| SHO Contraction (@52.2%) | −2.1 | −10.10 | −3.67 |

TABLE 6

Carbonization Pilot Oven Test Results of Indiana and Illinois Coals in Blends

|  | TC1931 30% III 30% EHV 40% EMV | TC1933 30% Ind 30% EHV 40% EMV | TC1935 80% Ind 20% PC | TC1940 45% Ind 15% EHV 40% EM | TC1941 45% Ind 15% EHV 40% WCM | TC1951 30% Ind 30% EHV 40% WCM | TC1952 30% III 30% EHV 40% WCM | TC1953 20% Ind 10% PC 30% EHV 40% WCM | TC1954 20% III 10% PC 30% EHV 40% WCM | TC1995 50% Ind 50% LVM |
| --- | --- | --- | --- | --- | --- | --- | --- | --- | --- | --- |
| Moisture (%) | 2.94 |  | 2.5 | 4.98 | 5.15 | 4.48 | 4.03 | 3.29 | 3.24 | 3.4 |
| Grind (%, −3.35 mm) | 97.1 | 93.3 | 87.6 | 90.7 | 91.1 | 91.9 | 92.7 | 94.6 | 96.9 | 91.0 |
| Dry oven bulk density (kg/m3) | 792 | 816 | 754 | 801 | 788 | 801 | 804 | 804 | 805 | 794 |
| Max oven wall pressure (kPa) | 5.65 | 6.27 | 2.55 | 4.62 |  | 3.45 | 4.07 | 4.07 | 3.58 | 7.23 |
| Coking time (h) | 16.87 | 16.37 | 16.05 | 17.13 | 17.03 | 17.05 | 17 | 16.6 | 16.1 | 17.02 |
| Stability | 61 | 60 | 42 | 58 | 63 | 57 | 61.1 | 60.5 | 60.7 | 62 |
| CSR | 61 | 68 | 24 | 57 | 65 | 65 | 70 | 72 | 71 | 66 |

TABLE 6-continued

Carbonization Pilot Oven Test Results of Indiana and Illinois Coals in Blends

|  | TC1931 30% Ill 30% EHV 40% EMV | TC1933 30% Ind 30% EHV 40% EMV | TC1935 80% Ind 20% PC | TC1940 45% Ind 15% EHV 40% EM | TC1941 45% Ind 15% EHV 40% WCM | TC1951 30% Ind 30% EHV 40% WCM | TC1952 30% Ind 30% EHV 40% WCM | TC1953 20% Ind 10% PC 30% EHV 40% WCM | TC1954 20% Ill 10% PC 30% EHV 40% WCM | TC1995 50% Ind 50% LVM |
|---|---|---|---|---|---|---|---|---|---|---|
| CRI | 30 | 22 | 44 | 32 | 24 |  | 21 | 20 |  | 28 |
| Hardness | 70 | 70 | 51.3 | 70 | 68 | 70 | 70 | 69 | 68 | 72 |
| Coke size (mm) | 61.73 | 65.53 | 70.9 | 70.74 | 69.3 | 62.8 | 59 | 61.3 | 64.2 | 62.6 |
| Coke yield (%) | 73.58 | 70.15 | 69.6 | 73.39 | 74.6 | 74.9 | 76.3 | 78 | 76.9 | 74.9 |
| SHO contraction % | −7.99 | −9.57 | −11.94 | −11.13 | −10.14 | −12.82 | −7.93 | −10.59 | −12.93 |  |
| Coke sulfur (%) |  |  |  |  |  | 0.66 |  | 0.93 |  |  |
| Coke ash (%) |  |  |  |  |  | 11.1 |  | 8.9 |  |  |

Note:
Ill = Illinois Coal;
Ind = Indiana Brazil Formation coal;
WCM = Western Canadian medium volatile coal,
EHV = Eastern high volatile;
EMV = Eastern medium volatile coal;
LVM = Alabama low volatile coal;
PC = petroleum coke In Table 6 it can be observed that a blend of 45% of Indiana Coal can be used in a slot oven to produce acceptable coke quality (see TC1941 containing 45% Indy-15% EHV-40% WCM). TC 1995 (50% of Indiana Brazil Block coal when blended with 50% of LVM Alabama coal) also produces acceptable coke quality in a slot oven. If such a blend is carbonized in a Heat Recovery/Non Recovery Coke Oven, it is anticipated that there will be similar or better performance in coke quality. One example is depicted in Table 7 where a blend containing 12% of Indiana coal was carbonized in six ovens of a Non Recovery Battery producing excellent quality coke.

TABLE 7

Non Recovery Six Oven Carbonization Test Results

|  | 65% HVM, 35% MVM/LVM (with 12% Indiana coal) | 64% HVM, 35% MVM/LVM |
|---|---|---|
| CSR | 70 | 71 |
| CRI | 21 | 20 |
| Stability | 64 | 64 |
| Hardness | 70 | 72 |

Another approach to increasing the percentage of Indiana/Illinois Basin coal for coke production involves locating the coke produced from this coal in upper regions of the blast furnace where higher reactivity is less of a concern. In such regions there is also less mechanical pressure on the individual pieces of coke since there is less material above it. This allows coke of reduced strength to be used.

The location of a multipurpose coke production process could be either near or at a coal mine or at an existing steel production facility. The choice of which location would be made based on business issues and also on the availability of transportation capabilities. Transportation of both coal and coke is necessary in this process since the coal used for coke production would be a blend of Indiana and other metallurgical coals. Production of coke at mine mouth would afford a transportation savings because a large portion of coal used by the coking facility would not have to be transported over a long distance. But, coal for blending as well as the finished coke would need to be transported. If sufficient transportation capability exists total transportation cost would be reduced since the mass of the product coke is less than the coal needed to produce it. Thus, a significant cost savings from the reduced weight per mile of material being transported would result if transportation capability was available.

Figure 4:
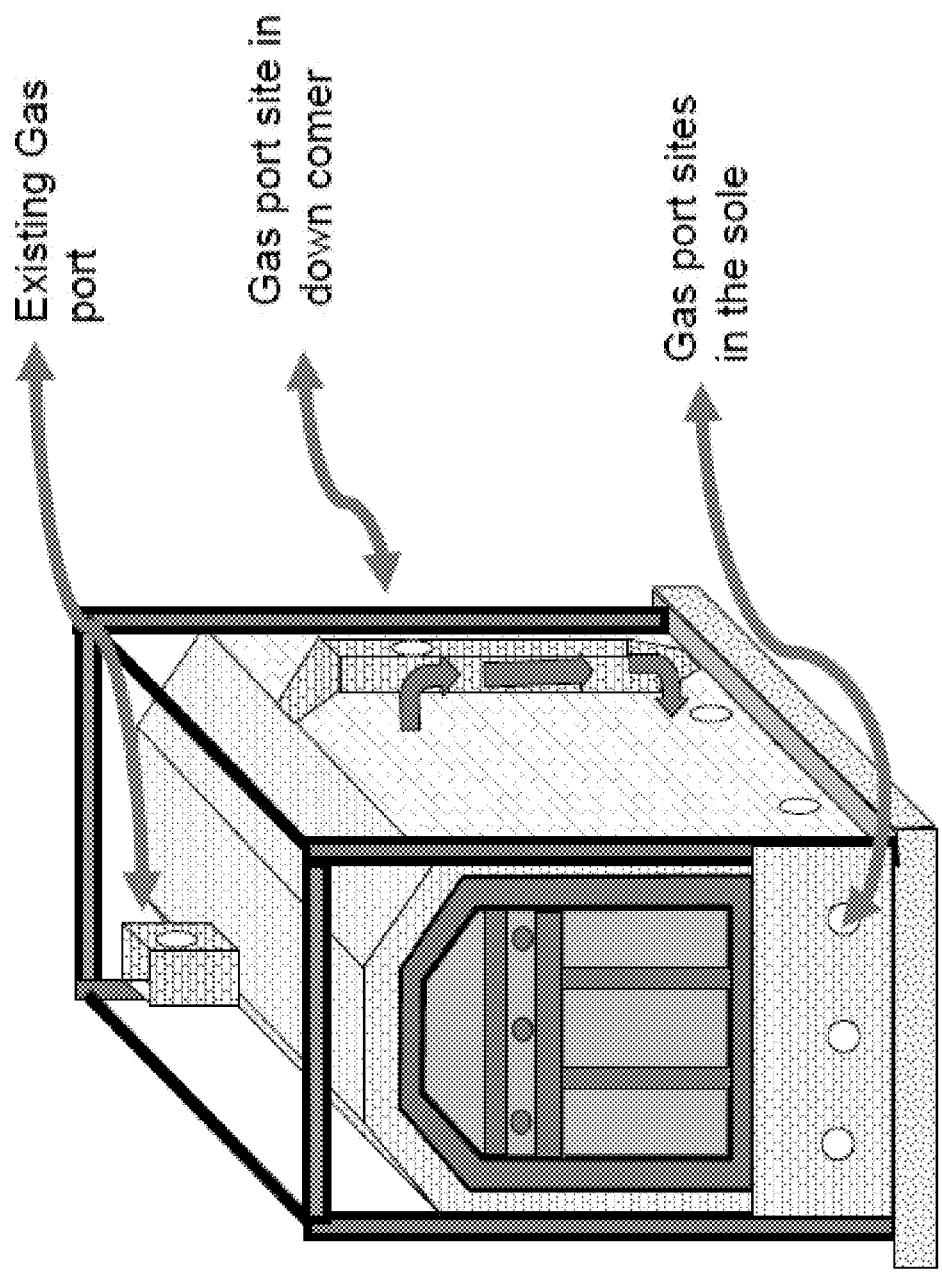
FIG. 4: Recovery Coke Oven according to one embodiment of the present invention.

This effort is developing a new approach to coke production in which there are multiple value streams from the conventional coke production process. These value streams include coke, electricity, liquid transportation fuels, fertilizer, and hydrogen. Product value is maximized by selectively extracting a portion of the coke oven gas at various stages of the coking process with a composition suitable for production of the particular ancillary product, such as methane gas, hydrogen gas, or other substances as described herein. FIG. 4 depicts the general concept for extraction of gas from a non recovery coke oven.

Some embodiments of the present invention provide a new source of coke, produced at mine mouth or locally, using Indiana/Illinois Basin coal which is up to 30% lower in cost. This coal has a higher volatile content than what is normally considered for current coking operations. Various embodiments of the present invention use the gas from the volatile material as feed material for production of other product value streams. This allows for an increase in the acceptable level of volatile material in the coal. The process selectively extracts portions of the gas and assist in increasing operational flexibility. For example, extraction of pyrolysis gas could reduce the occurrence of hot spots in the oven sole plate.

Figure 3A:
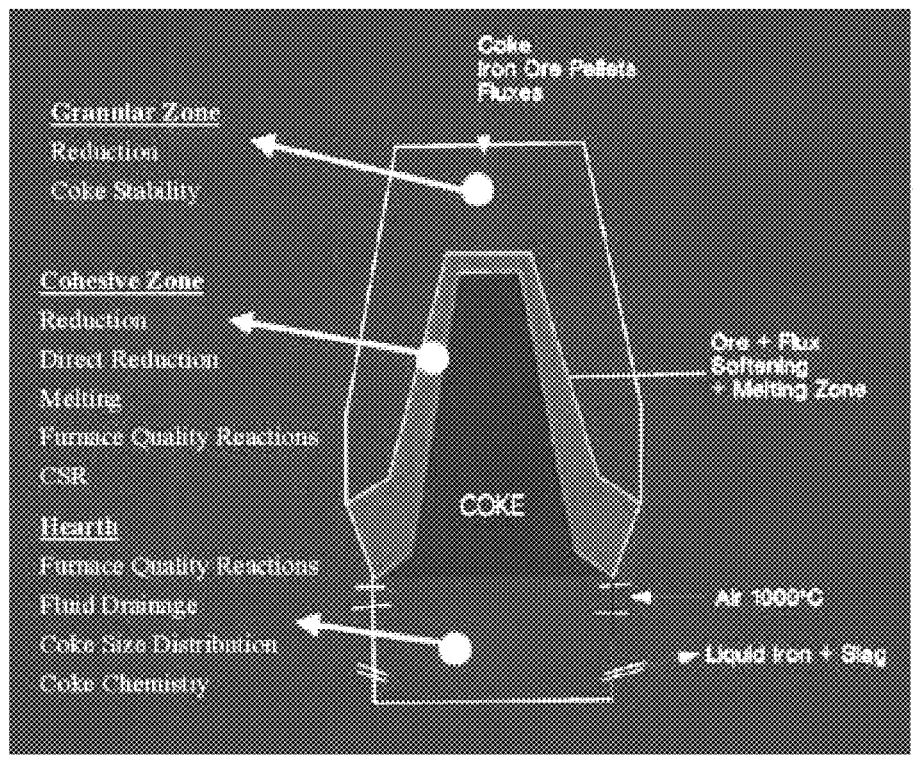
FIGS. 3(a) and 3(b): Typical Blast Furnace Zones
Figure 3B:
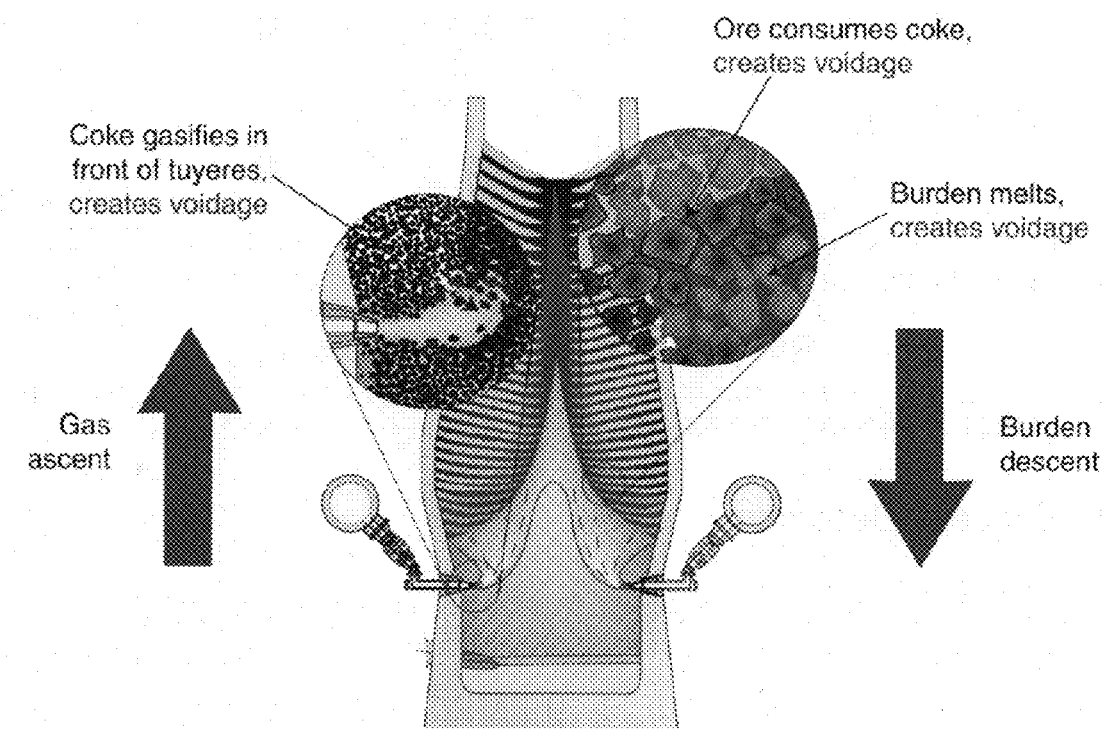

Another approach to increasing the percentage of Indiana coal for coke production involves locating that coke in upper regions of the blast furnace where higher reactivity is less of a concern. In this region there is also less mechanical pressure on the individual pieces of coke since there is less material above it. This would allow coke of reduced strength to be readily used in this region. FIGS. 3(a) and 3(b) depict various zones and layering for a typical blast furnace. Various embodiments of the present invention contemplate methods to use coke produced with a enhanced blend of Indiana coal in the upper coke layers.

The use of CFD analysis assists in maximizing the applicability and value of coke generated from Indiana coal. A blast furnace located in Northwest Indiana was modeled and the influences in changes in the coke properties resulting from the use of Indiana coal were considered on an exploratory basis.

Figure 17:
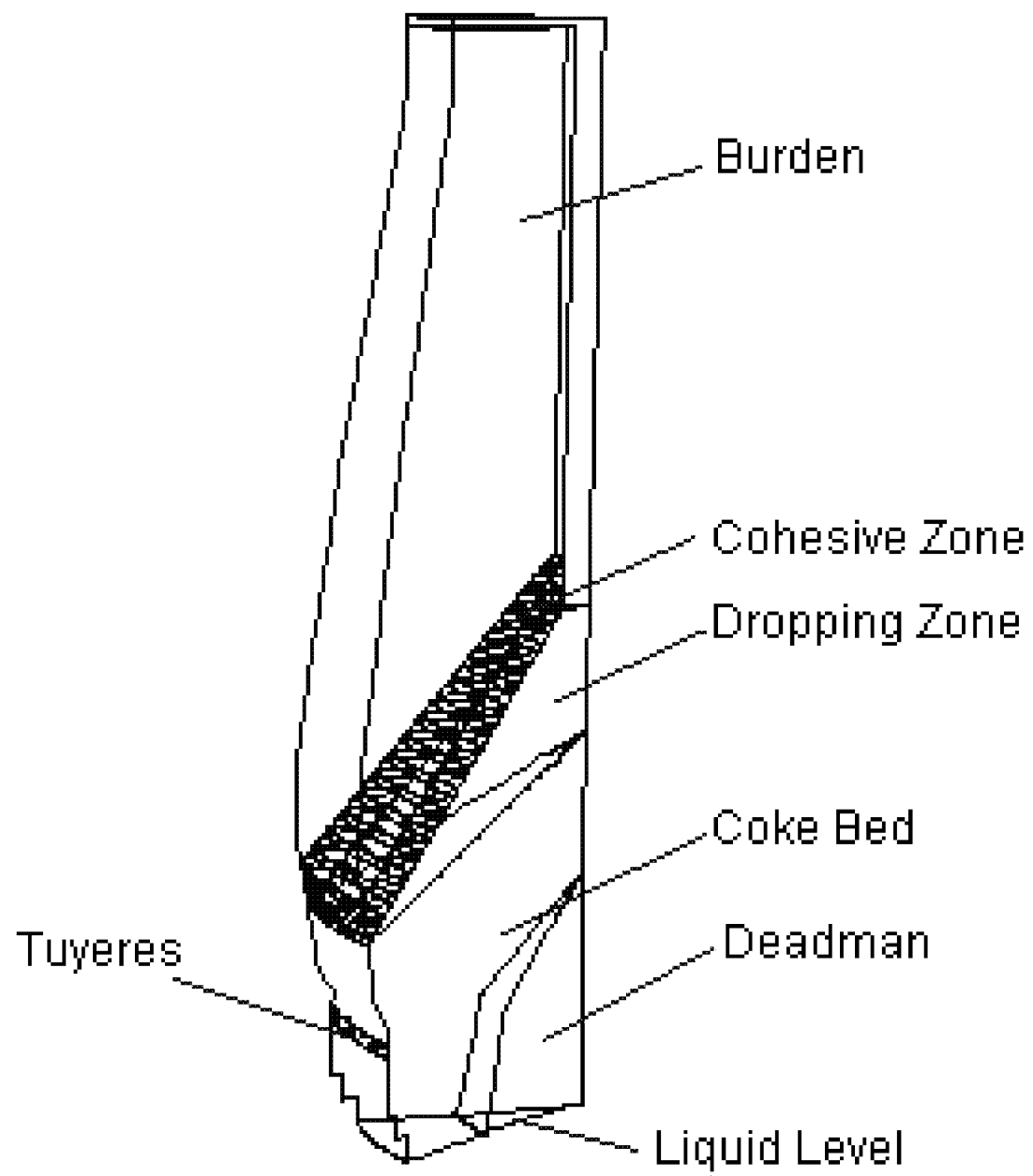
FIG. 17: Model Geometry used in analysis of a coke oven according to one embodiment of the present invention.

The geometry considered is depicted in FIG. 17. The cohesive zone was modeled with 34 alternating layers of coke and ore. The ore layer's porosity is assumed to be zero since the ore starts fusing and melting in the cohesive zone. The coke bed porosity in the cohesive zone is 0.5. The burden is treated as one zone with an effective porosity of 0.41. Various cases were run to find the effect of the ore and coke porosity, and ore and coke particle diameters. These cases are listed in Table 8.

TABLE 8

Cases Considered

| Case | Ore Porosity | Ore Diameter | Coke Porosity | Coke diameter |
|---|---|---|---|---|
| 1 | 0.35 | 0.012 | 0.5 | 0.0380 |
| 2 | 0.35 | 0.02 | 0.5 | 0.0380 |
| 3 | 0.35 | 0.006 | 0.5 | 0.0380 |
| 4 | 0.35 | 0.012 | 0.5 | 0.0600 |
| 5 | 0.35 | 0.012 | 0.5 | 0.0200 |
| 6 | 0.35 | 0.012 | 0.3 | 0.0380 |
| 7 | 0.35 | 0.012 | 0.65 | 0.0380 |
| 8 | 0.5 | 0.012 | 0.5000 | 0.0380 |
| 9 | 0.2 | 0.012 | 0.5000 | 0.0380 |

Figure 18:
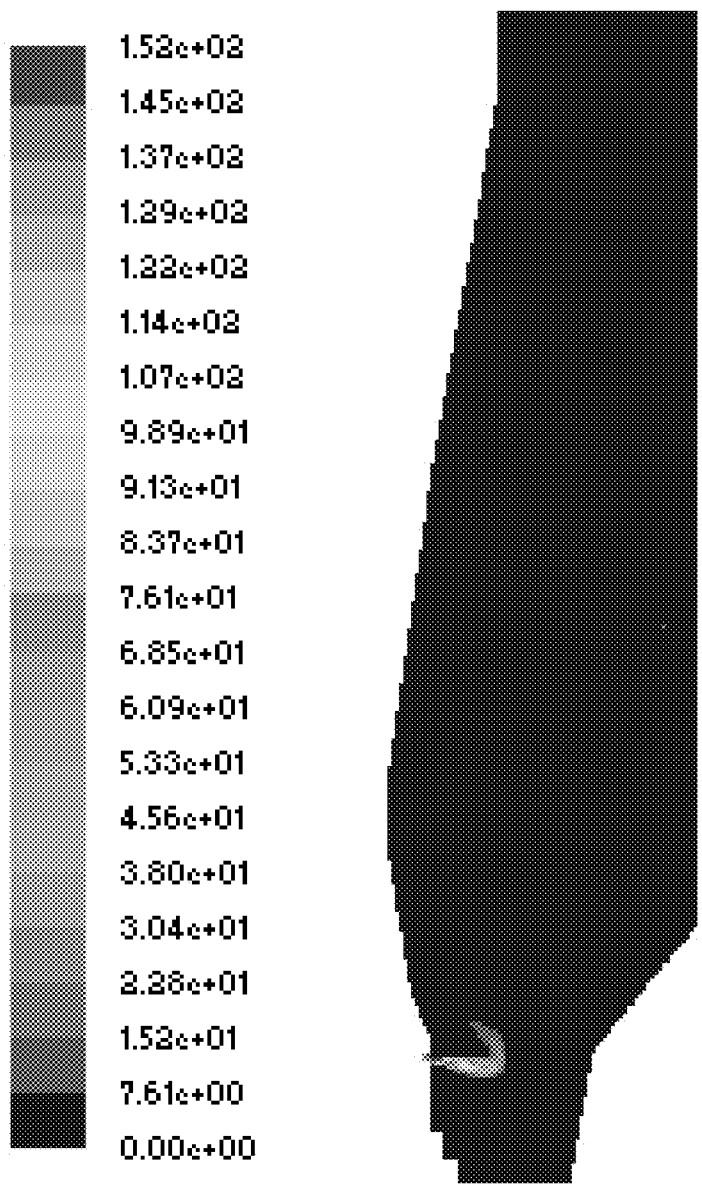
FIG. 18: Velocity Profile predicted using the model of FIG. 17.
Figures 21D, 21E, 21F:
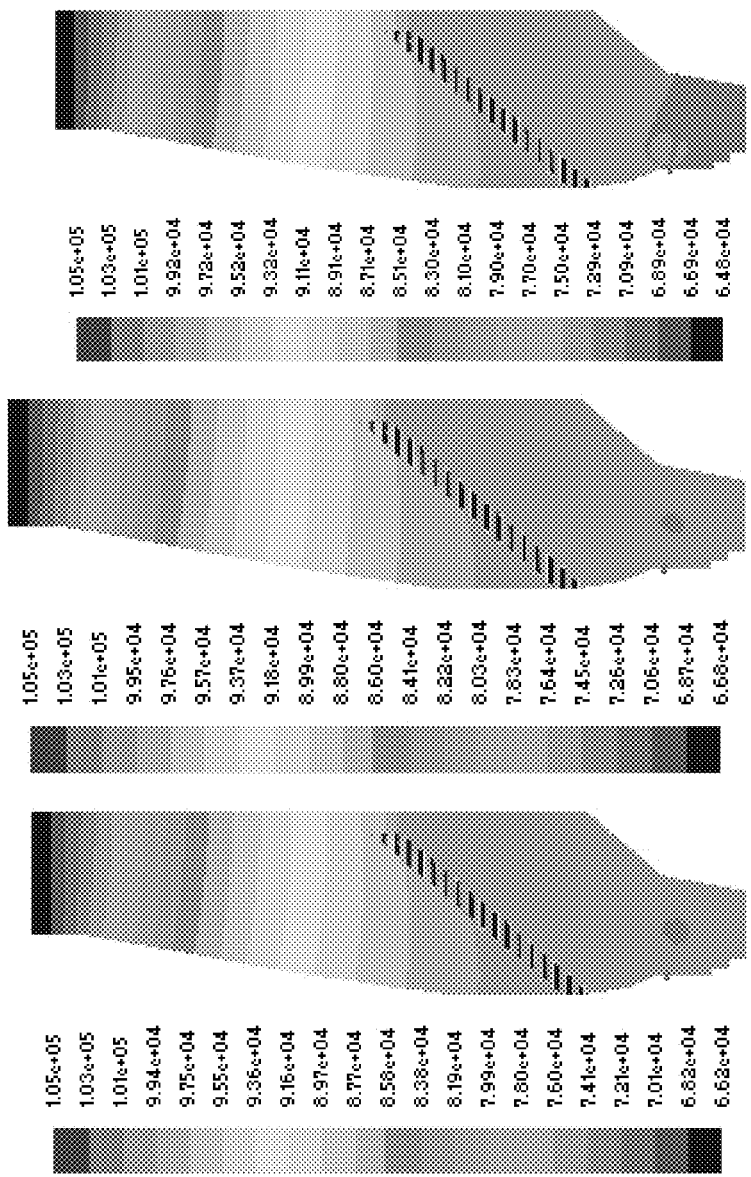
FIG. 21(d): Pressure Loss predicted using the model of FIG. 17.
FIG. 21(e): Pressure Loss predicted using the model of FIG. 17.
FIG. 21(f): Pressure Loss predicted using the model of FIG. 17.
Figures 23A, 23B:
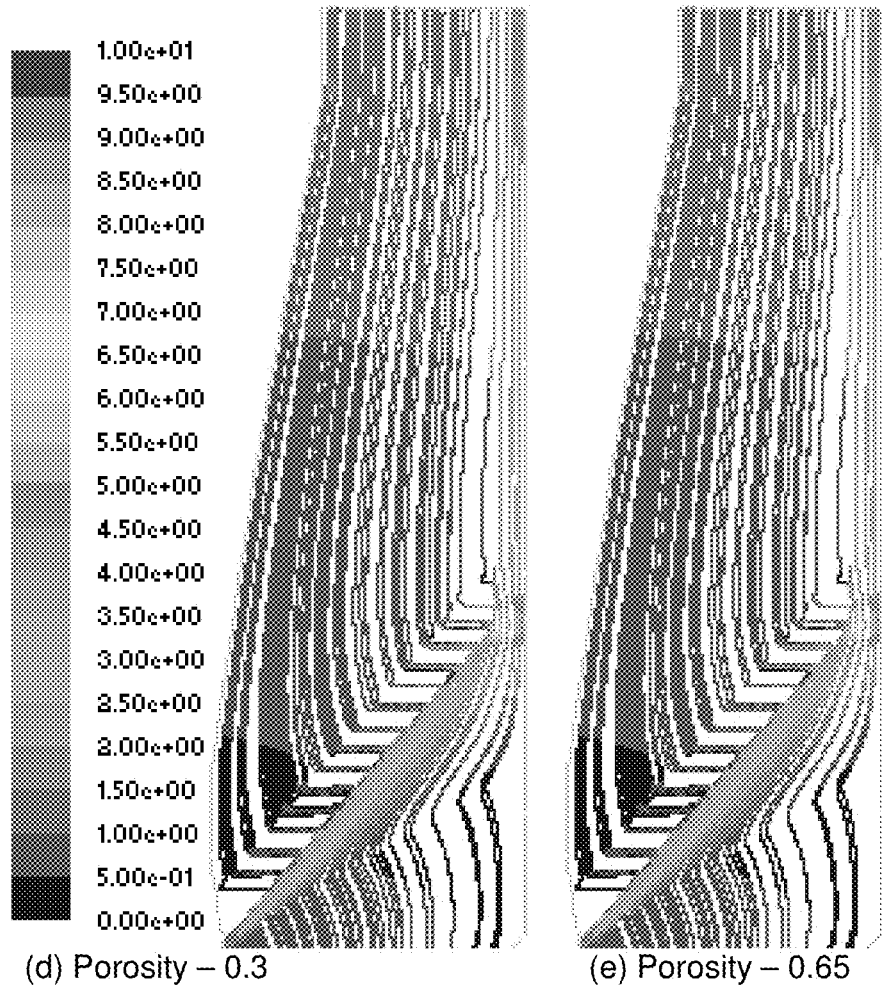
FIG. 23(a): Flow Lines for Various Coke Properties predicted using the model of FIG. 17.
FIG. 23(b): Flow Lines for Various Coke Properties predicted using the model of FIG. 17.
Figure 24:
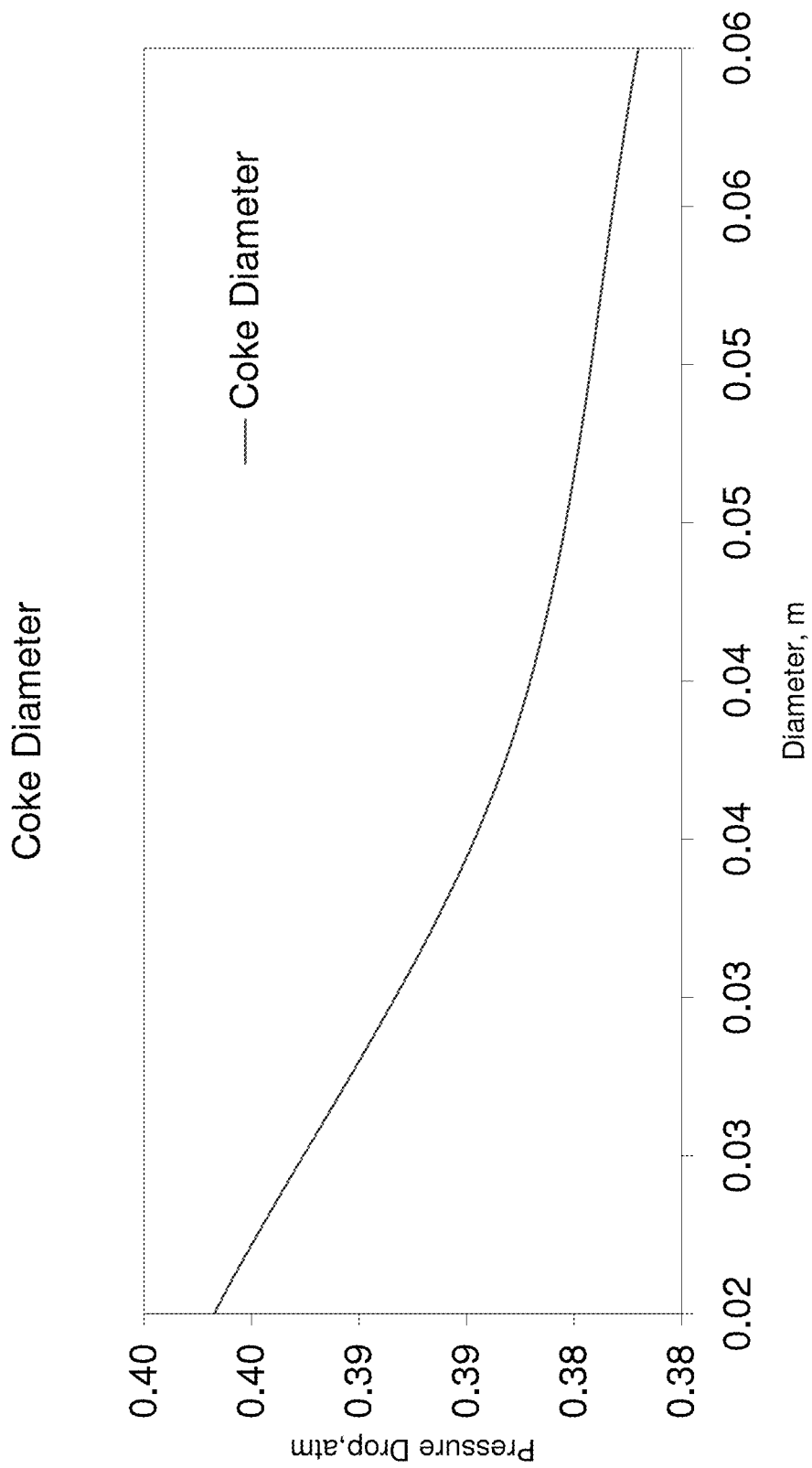
FIG. 24: Pressure Drop vs. Coke Diameter predicted using the model of FIG. 17.
Figure 25:
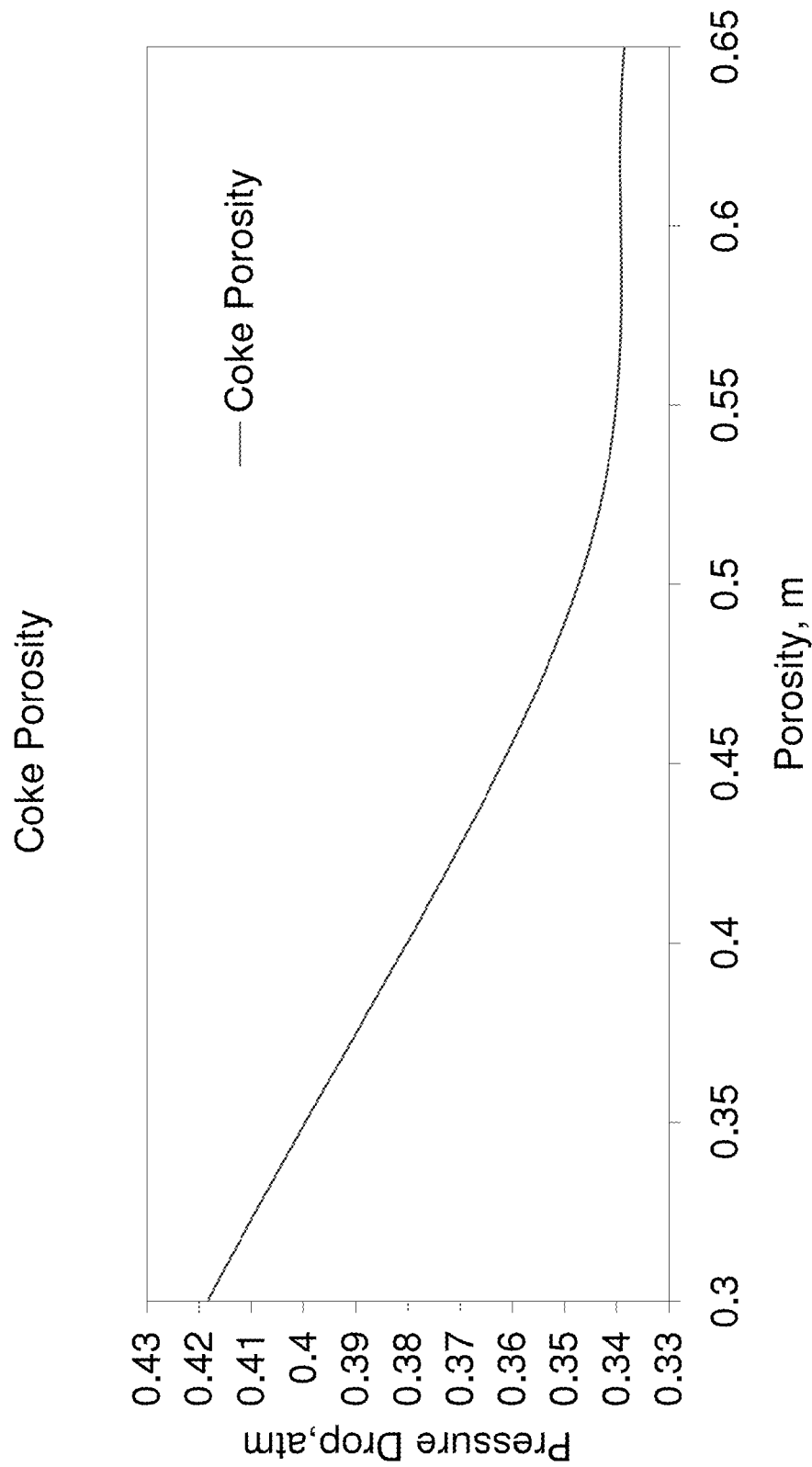
FIG. 25: Pressure Drop vs. Coke Porosity predicted using the model of FIG. 17.
Figure 26:
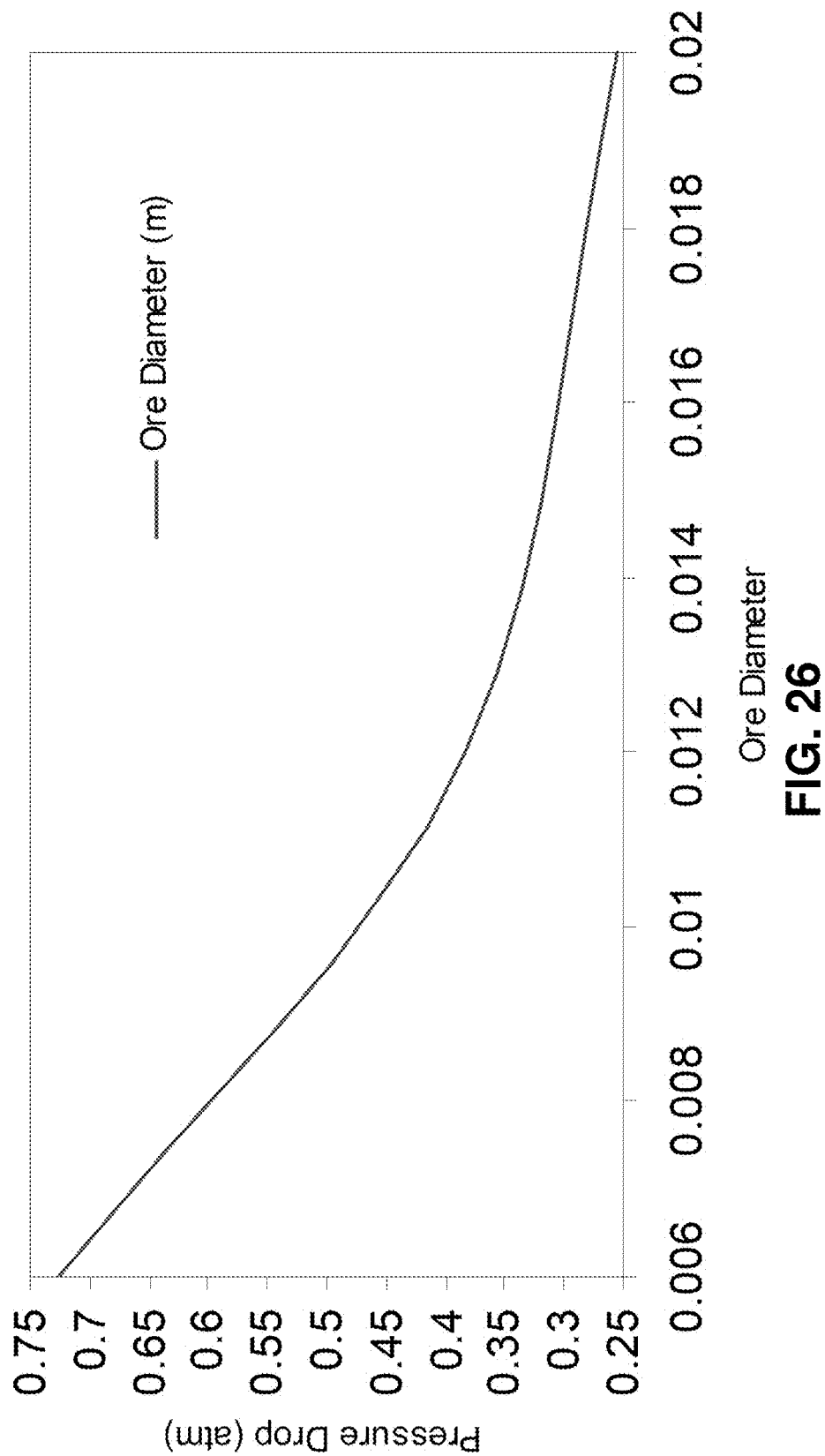
FIG. 26: Pressure Drop vs. Ore Diameter predicted using the model of FIG. 17.
Figure 27:
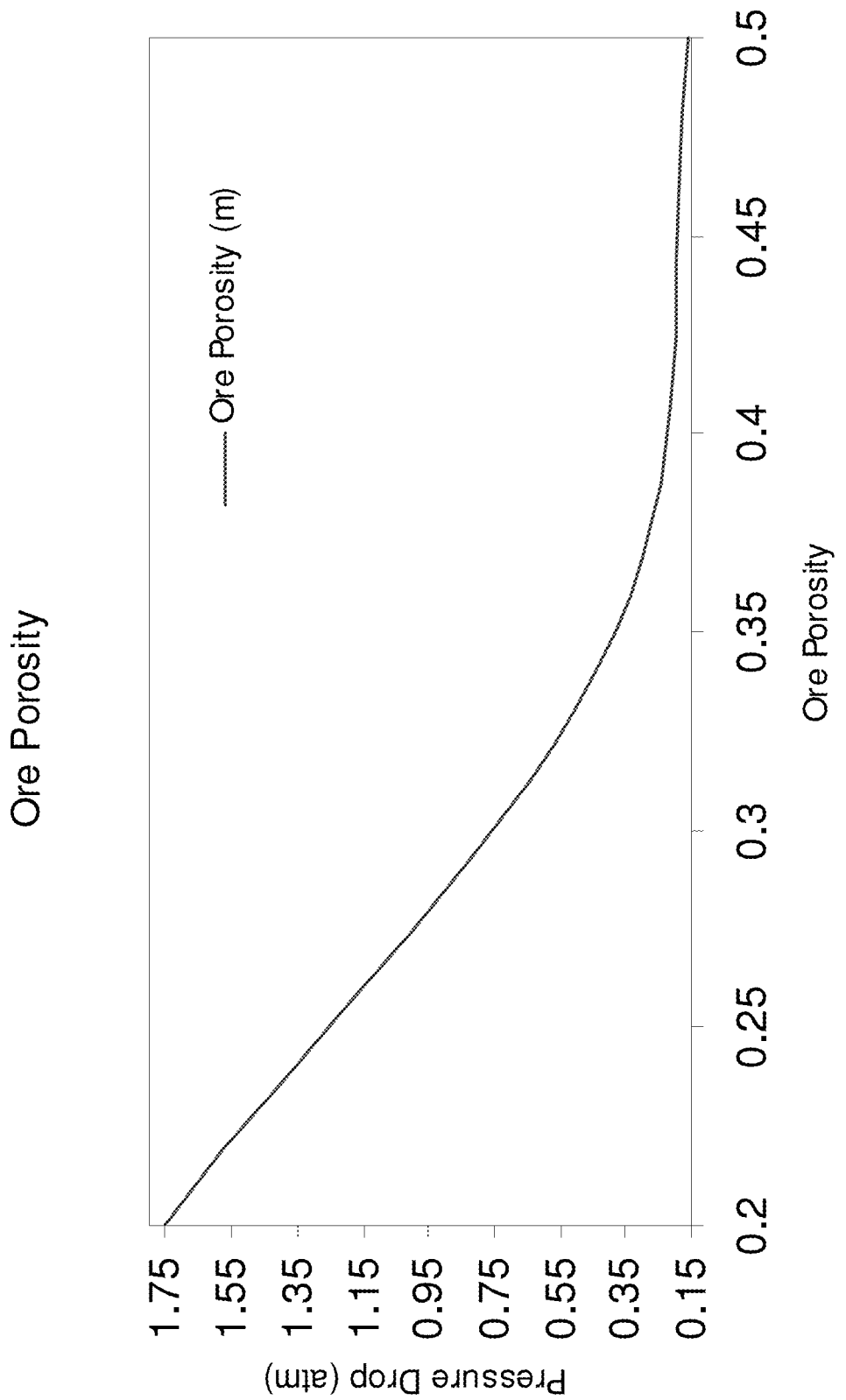
FIG. 27: Pressure Drop vs. Ore Porosity predicted using the model of FIG. 17.

The velocity profile was similar for all the cases as shown in FIG. 18. From FIG. 29 it can be observed that the velocity decreases as we move away from the tuyere due to the effect of the porous zone in coke bed. The gas flow is primarily upward. The velocity is uniform in the other zones of the blast furnace.

The pressure drop for the different cases is depicted in FIGS. 19(a) thru 21(c). It can be observed that as the ore diameter, ore porosity, coke diameter and coke porosity increases, the pressure drop from the tuyere level to the top of the furnace decreases. The effect of the ore layer is more dominant as the ore layer thickness is higher than the coke layer thickness.

Gas flow streamlines colored by velocity magnitude are depicted in FIGS. 22(a) thru 23(b). The gas velocity is higher in the region of the chimney. The velocity is similar for most of the cases considered.

The effect of the coke diameter in the burden is depicted in FIGS. 24-27. As coke diameter increases, the pressure drop decreases mainly due to the increased inertial and viscous resistance to the gas flow. The same is true for the effect of coke bed porosity and the ore diameter and porosity. The effective gas porosity or gas permeability of the burden decreases in all the cases and leads to reduced pressure drop in all the modeled cases.

It can be concluded that the pressure drop from the tuyere level to the top of the furnace decreases with increasing the coke and ore diameters and also increasing the coke and ore porosities. This information is used to assist in increasing the percentage of Indiana-type coal used for producing coke for use in blast furnaces while maintaining the integrity of the blast furnace wall structure.

One embodiment contemplates modifying the mass balance in the coking process in a way that allows for a usable level of gas production that could be used to power a combustion turbine for electric production. It has been found that a portion of the pyrolysis gas could be extracted from the gas stream as it is recirculated to the floor of a non recovery coke oven also referred to as the sole plate. FIGS. 2 and 4 show the gas recirculation down corners in one non recovery design.

The location of the coke production process is either near or at a coal mine or at an existing production facility. The choice of which location is based on business issues and also on the availability of transportation capabilities. The coal used for coke production is preferably a blend of Indiana and other metallurgical coals. Production of coke at mine mouth affords a transportation savings because a large portion of coal used by the coking facility would not have to be transported over a long distance. Coal for blending as well as the finished coke can be transported. Total transportation cost can be reduced since the mass of the product coke is less than the coal needed to produce it. Thus, there is a cost savings from the reduced weight per mile of material being transported would result if transportation capability was available. FIG. 1(b) depicts the location of some of the Indiana coal resources. Various embodiments consider issues of distance and availability of transportation as part of the commercialization planning process.

A coking/coal gasification process according to one embodiment of the present invention produces metallurgical grade coke using 20-40% Indiana coal and, at the same time, produces a byproduct gas stream that would be usable in a cogeneration facility for the production of electricity to be sold in the electric market. In some embodiments 100 MW of electricity could be generated from a large coke production facility and that electric grid reliability in either the mine mouth or industrial locations considered would be increased as a result of the additional generation. Alternatives for electric production including heat recovery and potentially partial coal gasification were also evaluated. Electric production in conjunction with coke production provides an economic benefit.

Existing or planned coke production facilities would be used as part of the developmental process thereby reducing the process development risk as compared to construction of a dedicated test facility. The proposed process is based upon a design in which the risk and financing level for development of an operating facility is reduced by developing the technology in conjunction with an operating or planned coking facility. The value of products, including liquid fuels, would be evaluated in comparison with conventional coke production operation. The amount of such products produced would are determined by optimizing the value of the various product streams. The process would adapt itself to changing market conditions. This would reduce the risk of developing new coal based liquid fuel production capability since the major capital expenditure, the gasifier, is already justified for conventional coke production. This technology can provide a knowledge base in the near term with less cost than a dedicated gasification facility that could then be leveraged for the development of large scale dedicated gasification facilities.

A process for the sequestration of the carbon dioxide produced by the process is contemplated in some embodiments of the present invention. Some embodiments include producing a usable chemical product as part of the carbon dioxide sequestration process by the use of a nano catalysis. One concept includes using a nano catalysist to enhance the coke oven gas based Fischer-Tropsch process for the production of liquid transportation fuels.

One embodiment of the present invention includes finding ways to increase the use of various coal grades in coking and other related industrial operations in a way that increases overall value. By finding ways to increase the use such coal (including Indiana coal) in such processes, imports of coal can be decreased and there will be a potential to open new markets for various grades of coal.

Environmental emissions are often cited as a reason why some coal is not used in the production of coke. The process as described herein presents a different option that inverts the classic coke production paradigm. This includes a process in which clean coal technology is used at the mine mouth or at an industrial location to produce coke, rather than transporting coal from sources outside Indiana to non attainment areas for coke production. Gas streams from the coking process are collected and used for subsequent production of electricity at the site or possibly the production of liquid transportation fuel. The inventive processes discussed herein result in a net transportation savings, as well as a value stream from cogenerated electricity. Such a facility will provide base load electric generation, but will also have the capability to supply shoulder and peaking power, in addition to, potentially ancillary services.

While the inventions have been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for producing coke, comprising:
providing a recovery coke oven capable of operation over a range of temperatures and a processing plant in fluid communication with the coke oven;
providing a first coal from a first source;
providing a second coal from a second source different than the first source;
analyzing the volatile gas content of the first coal within the range of temperatures;
selecting a temperature from the range of temperatures that will release a desired concentration of at least one volatile gas;
supplying a blend of the first coal and the second coal into the coke oven;
pyrolizing at the selected temperature the blend of the first coal and the second coal in the coke oven to release the gas; and
providing the released gas to the processing plant.

2. The method of claim 1 wherein the coke oven is located proximate to the first source.

3. The method of claim 1 wherein the gases are at least one of hydrogen, methane, or acetylene.

4. The method of claim 1 which further comprises substantially obstructing the introduction of oxygen to the top of the oven.

5. The method of claim 1 which further comprises substantially obstructing the flow of released gas to a sole plate of the oven.

6. The method of claim 1 wherein the processing plant includes an electric generator and said providing comprises driving the generator with energy released from the gas.

7. The method of claim 1 wherein the processing plant uses the Fischer-Tropsch process to produce a liquid hydrocarbon.

8. The method of claim 1 wherein the selected temperature is greater than about 500 deg. C and less than about 800 deg. C.

9. The method of claim 1 wherein said pyrolizing is by slow pyrolysis at a temperature less than about 850 deg. C.

10. A method for producing coke, comprising:
providing a recovery coke oven capable of operation over a range of temperatures and a processing plant in fluid communication with the coke oven;
providing a first coal from a first source, the first coal containing a volatile gas releasable by pyrolysis;
providing a second coal from a second source;
calculating a future demand for at least one of electricity, coke, or a liquid fuel prepared from the volatile gas;
determining a blend of the first coal and the second coal from said calculating;
pyrolizing the determined blend of the first coal and the second coal in the coke oven to release the gas and produce a quantity of coke; and
using the released gas in the processing plant.

11. The method of claim 10 wherein the first source provides coal mined from a vein of coal that extends within Illinois or Indiana.

12. The method of claim 10 wherein the first coal is of a type that produces nut coke or coke breeze.

13. The method of claim 10 wherein the first coal is of a type that includes more than about six percent Liptinite.

14. The method of claim 10 wherein the first coal is of a type that includes more than about eight percent Liptinite.

15. The method of claim 10 wherein the coke oven is located proximate to the site where the coke is used in a steel making process.

16. The method of claim 10 which further comprises analyzing the volatile gas content of the first coal over the range of temperatures.

17. The method of claim 10 which further comprises analyzing the volatile gas content of the second coal over the range of temperatures.

18. The method of claim 10 which further comprises estimating the volatile gas content of the second coal as a function of temperature.

19. The method of claim 10 wherein said pyrolizing is by slow pyrolysis at a temperature less than about 850 deg. C.

20. The method of claim 10 which further comprises selecting a temperature from the range of temperatures to produce a desired quantity of the volatile gas, and wherein said pyrolizing is at the selected temperature.

21. The method of claim 10 wherein the coke oven is located proximate to a site where the coke is used in a steel making process.

* * * * *